United States Patent
Yumoto et al.

(10) Patent No.: US 8,647,404 B2
(45) Date of Patent: Feb. 11, 2014

(54) INDOOR UNIT OF AIR CONDITIONER

(75) Inventors: Yoshiaki Yumoto, Osaka (JP); Kazuto Yamagata, Osaka (JP); Tsuyoshi Yokomizo, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 493 days.

(21) Appl. No.: 13/000,525

(22) PCT Filed: Apr. 26, 2010

(86) PCT No.: PCT/JP2010/002990
§ 371 (c)(1),
(2), (4) Date: Dec. 21, 2010

(87) PCT Pub. No.: WO2010/125796
PCT Pub. Date: Nov. 4, 2010

(65) Prior Publication Data
US 2011/0100052 A1    May 5, 2011

(30) Foreign Application Priority Data
Apr. 30, 2009   (JP) .................................. 2009-111066

(51) Int. Cl.
   *B01D 46/00*   (2006.01)
(52) U.S. Cl.
   USPC ................... 55/289; 55/295; 55/428; 55/471
(58) Field of Classification Search
   USPC ........ 55/282–305, 385.1–385.8; 62/303–316, 62/426–429; 15/159.1–207.2, 15/257.1–257.9; 165/4–10, 95, DIG. 10, 165/DIG. 11, DIG. 85
   See application file for complete search history.

(56) References Cited

U.S. PATENT DOCUMENTS

| 8,007,553 | B2 * | 8/2011 | Cho et al. ..................... 55/283 |
| 8,038,517 | B2 * | 10/2011 | Shibuya et al. ............... 454/187 |
| 2008/0223062 | A1 * | 9/2008 | Yabu et al. .................. 62/259.1 |
| 2009/0183471 | A1 * | 7/2009 | Shibuya et al. ............. 55/282.2 |
| 2009/0211284 | A1 * | 8/2009 | Yabu et al. .................. 62/259.1 |
| 2010/0043362 | A1 * | 2/2010 | Okada et al. ................... 55/296 |
| 2010/0107575 | A1 * | 5/2010 | Zhang et al. ................... 55/289 |
| 2010/0107671 | A1 * | 5/2010 | Okada et al. ................ 62/259.1 |
| 2010/0116463 | A1 * | 5/2010 | Zhang et al. ................... 165/95 |
| 2010/0159818 | A1 * | 6/2010 | Sakashita et al. ............. 454/233 |

(Continued)

FOREIGN PATENT DOCUMENTS

EP   2058602 A1   5/2009
JP   2008-57882 A   3/2008

(Continued)

*Primary Examiner* — Duane Smith
*Assistant Examiner* — Thomas McKenzie
(74) *Attorney, Agent, or Firm* — Birch, Stewart, Kolasch & Birch, LLP

(57) ABSTRACT

An indoor unit of an air conditioner includes an indoor fan, an air filter for capturing dust in an air drawn by the indoor fan, a brush mechanism for removing the dust adhering to the air filter, and a dust storage container for storing the dust removed from the air filter by the brush mechanism. The dust storage container is provided with an opening in which the brush mechanism is positioned. A sealing member is attached to the dust storage container, the sealing member being provided in the dust storage container and between the opening and a storage space in which the dust is stored, for sealing a space between an inner wall surface of the dust storage container and the brush mechanism.

6 Claims, 13 Drawing Sheets

(56) References Cited

U.S. PATENT DOCUMENTS

| | | | |
|---|---|---|---|
| 2010/0199697 A1* | 8/2010 | Sakashita | 62/259.1 |
| 2010/0263827 A1* | 10/2010 | Sakashita et al. | 165/59 |
| 2010/0287967 A1* | 11/2010 | Sakashita et al. | 62/303 |
| 2010/0287968 A1* | 11/2010 | Sakashita et al. | 62/303 |
| 2010/0294134 A1* | 11/2010 | Yokomizo et al. | 96/405 |
| 2010/0317282 A1* | 12/2010 | Okada et al. | 454/292 |

FOREIGN PATENT DOCUMENTS

| | | |
|---|---|---|
| JP | 2008-196747 A | 8/2008 |
| JP | 2009-24984 A | 2/2009 |
| WO | WO 2008/142863 A1 | 11/2008 |

* cited by examiner (A)

(B)

(C)

(A) NORMAL OPERATION (B) FILTER CLEANING OPERATION (C) FILTER CLEANING OPERATION (A)

(B)

INDOOR UNIT OF AIR CONDITIONER

TECHNICAL FIELD

The present invention relates to indoor units of air conditioners having a function of removing dust adhering to an air filter.

BACKGROUND ART

In door units of air conditioners having a function of removing dust adhering to an air filter (i.e., cleaning function) have been known. For example, Patent Document 1 discloses an indoor unit of an air conditioner of this type.

Specifically, FIG. 2 of Patent Document 1 shows an indoor unit of an air conditioner in which dust adhering to an inlet filter is removed by a rotating brush. The rotating brush is positioned at an opening of a dust storage container.

CITATION LIST

Patent Document

PATENT DOCUMENT 1: Japanese Patent Publication No. 2008-196747

SUMMARY OF THE INVENTION

Technical Problem

An indoor unit of an air conditioner of this type is configured such that the dust storage container for storing dust is positioned in an airflow caused by an indoor fan. Thus, according to the indoor unit of the conventional air conditioner, there is a possibility that air in the dust storage container may flow out from the dust storage container because of the indoor fan under operation, and that dust stored in the dust storage container may flow out through the opening of the dust storage container together with the air.

The present invention was made in view of the above problem, and it is an objective of the invention to prevent dust in a dust storage container from flowing out through an opening of the dust storage container, in an indoor unit of an air conditioner having a function of removing dust adhering to an air filter.

Solution to the Problem

The first aspect of the present invention is an indoor unit of an air conditioner, including: an indoor fan (21); an air filter (30) for capturing dust in an air drawn by the indoor fan (21); a brush mechanism (51, 52) for removing the dust adhering to the air filter (30); and a dust storage container (60) having an opening (63) in which the brush mechanism (51, 52) is positioned, for storing the dust removed from the air filter (30) by the brush mechanism (51, 52), wherein the indoor unit includes a sealing member (45, 46) provided in the dust storage container (60) and between the opening (63) and a storage space (58) in which the dust is stored, for sealing a space between an inner wall surface of the dust storage container (60) and the brush mechanism (51, 52).

According to the first aspect of the present invention, a space between the inner wall surface of the dust storage container (60) and the brush mechanism (51, 52) is sealed with the sealing member (45, 46) which is provided in the dust storage container (60) and between the storage space (58) and the opening (63). Thus, almost no airflow flowing from the storage space (58) to the opening (63) is generated in the dust storage container (60) during the operation of the indoor fan (21).

The second aspect of the present invention is that in the first aspect of the present invention, the brush mechanism (51, 52) includes a rotating brush (51) having a flocked portion (51b) which is provided on an outer peripheral surface of a rotatable, rod-like member (51a) and which comes in contact with the air filter (30), and the sealing member (45) is provided at least between the inner wall surface of the dust storage container (60) and the rotating brush (51), and is attached to the dust storage container (60).

According to the second aspect of the present invention, the sealing member (45) is not attached to the rotating brush (51), but attached to the dust storage container (60) to seal the space between the inner wall surface of the dust storage container (60) and the outer peripheral surface of the rotating brush (51). Here, the sealing member (45) can be attached to the rotating brush (51). In that case, however, the location of the sealing member (45) is changed by the rotation of the rotating brush (51). Thus, the sealing member (45) and the inner wall surface of the dust storage container (60) may be temporarily spaced apart from each other, resulting in generation of an airflow. If the sealing member (45) is attached to the dust storage container (60) as described above, the location of the sealing member (45) is not changed by the rotation of the rotating brush (51). As a result, the space between the inner wall surface of the dust storage container (60) and the outer peripheral surface of the rotating brush (51) is sealed with the sealing member (45) all the time.

The third aspect of the present invention is that in the second aspect of the present invention, the brush mechanism (51, 52) includes the rotating brush (51), and a brush cleaning member (52) which is provided in a space between the outer peripheral surface of the rotating brush (51) and an inner wall surface of the dust storage container (60) that is opposite to the sealing member (45) with respect to the rotating brush (51), and which is provided along an axial direction of the rotating brush (51), for coming in contact with the flocked portion (51b) and removing the dust adhering to the flocked portion (51b).

According to the third aspect of the present invention, the sealing member (45) is provided between the inner wall surface of the dust storage container (60) and the outer peripheral surface of the rotating brush (51). Further, the brush cleaning member (52), which comes in contact with the flocked portion (51b), is provided on an inner wall surface of the dust storage container (60) that is opposite to the sealing member (45) with respect to the rotating brush (51). That is, one of the spaces located on both lateral sides of the outer peripheral surface of the rotating brush (51) is sealed with the brush cleaning member (52), and the other is sealed with the sealing member (45).

The fourth aspect of the present invention is that in the third aspect of the present invention, the sealing member (45) extends from the inner wall surface of the dust storage container (60) to a lower portion of the rotating brush (51).

According to the fourth aspect of the present invention, the sealing member (45) is in the vicinity of, or in contact with, a lower portion of the rotating brush (51). That is, the sealing member (45) seals the space between the inner wall surface of the dust storage container (60) and the outer peripheral surface of the rotating brush (51), at a lower portion of the rotating brush (51).

The fifth aspect of the present invention is that in the third or fourth aspect of the present invention, the rotating brush (51) is configured such that the flocked portion (51b) is provided only in a region of the outer peripheral surface of the rod-like member (51a) in a circumferential direction, and is configured so as to be rotatable in opposite directions about a rotational axis in such a manner that the flocked portion (51b) moves back and forth in a predetermined angle region of a region along an entire circumference of the rod-like member (51a), and the sealing member (45) extends toward a region other than the predetermined angle region of the region along the entire circumference of the rod-like member (51a).

According to the fifth aspect of the present invention, the sealing member (45) extends toward a region through which the flocked portion (51b) does not pass, of the region along the entire circumference of the rod-like member (51a). Thus, the sealing member (45) can be prevented from coming in contact with the flocked portion (51b) even when the rotating brush (51) is rotated.

The sixth aspect of the present invention is that in the fifth aspect of the present invention, the sealing member (45) includes a flat plate-shaped sealing portion (45a) which extends from the inner wall surface of the dust storage container (60) to the rotational axis of the rotating brush (51).

According to the sixth aspect of the present invention, the sealing portion (45a) of the sealing member (45) extends toward the rotational axis of the rotating brush (51). Here, the sealing member (45) is configured such that the sealing portion (45a) is in contact with, or in the vicinity of, the outer peripheral surface of the rotating brush (51) to seal the space between the inner wall surface of the dust storage container (60) and the outer peripheral surface of the rotating brush (51). Even in the case where the sealing portion (45a) is designed to be in the vicinity of the outer peripheral surface of the rotating brush (51), tolerances may cause the sealing portion (45a) to come in contact with the outer peripheral surface of the rotating brush (51) while the rotating brush (51) is rotated. If the sealing portion (45a) comes in contact with the outer peripheral surface of rotating brush (51) as described, the rotational torque necessary for driving the rotating brush (51) increases. According to the sixth aspect of the present invention, the sealing portion (45a) of the sealing member (45) extends toward the rotational axis of the rotating brush (51). Therefore, whether the rotating brush (51) is rotated in either direction, the rotating brush (51) being rotated in opposite directions about the rotational axis, the rotational torque is generally the same.

The seventh aspect of the present invention is that in any one of the first to sixth aspects of the present invention, the dust storage container (60) includes an upper portion (61) which accommodates the brush mechanism (51, 52), and a lower portion (62) which protrudes from a lower end of the upper portion (61) to a lateral side, thereby forming the storage space (58), and the sealing member (45) is provided on an inner wall surface of the upper portion (61) that is on the side from which the lower portion (62) protrudes.

According to the seventh aspect of the present invention, the sealing member (45) is provided on an inner wall surface of the upper portion (61) that is on the side from which the lower portion (62) protrudes. That is, the sealing member (45) is provided on an inner wall surface of the upper portion (61) on the side of the lower portion (62) at which much dust is stored.

Advantages of the Invention

According to the present embodiment, a space between the inner wall surface of the dust storage container (60) and the brush mechanism (51, 52) is sealed with the sealing member (45, 46) which is provided in the dust storage container (60) and between the storage space (58) and the opening (63). Thus, almost no airflow flowing from the storage space (58) to the opening (63) is generated in the dust storage container (60) during the operation of the indoor fan (21). Accordingly, it is possible to prevent the dust in the storage space (58) from flowing out through the opening (63).

According to the second aspect of the present invention, the sealing member (45) is attached not to the rotating brush (51), but to the inner wall surface of the dust storage container (60). Thus, the location of the sealing member (45) is not changed by the rotation of the rotating brush (51). It is therefore possible to seal the space between the inner wall surface of the dust storage container (60) and the outer peripheral surface of the rotating brush (51) with the sealing member (45) all the time. As a result, it is possible to prevent the generation of an airflow flowing from the storage space (58) to the opening (63) more reliably, and possible to prevent the dust in the storage space (58) from flowing out through the opening (63) more reliably.

According to the third aspect of the present invention, one of the spaces located on both lateral sides of the outer peripheral surface of the rotating brush (51) is sealed with the brush cleaning member (52), and the other is sealed with the sealing member (45), thereby enabling sealing of the both spaces. Furthermore, the structure in the dust storage container (60) can be simplified by configuring the cleaning brush (52) to serve as a sealing member, as well, in one of the spaces located on both lateral sides of the outer peripheral surface of the rotating brush (51).

Further, according to the third aspect of the present invention, the sealing member (45) is positioned at a location opposite to the side at which the dust adhering to the rotating brush (51) is dropped by the cleaning brush (52), with respect to the rotating brush (51). In other words, the sealing member (45) is located in one of the spaces located on both lateral sides of the outer peripheral surface of the rotating brush (51) that is on the side at which almost no dust is dropped. Thus, almost no dust is accumulated on the sealing member (45). It is therefore possible to prevent dust in the dust storage container (60) from flowing out through the opening (63).

According to the fifth aspect of the present invention, the sealing member (45) extends toward a region through which the flocked portion (51b) does not pass, of the region along the entire circumference of the rod-like member (51a). Thus, it is possible to prevent the sealing member (45) from coming in contact with the flocked portion (51b). As a result, according to the fifth aspect of the present invention, it is possible to prevent the flocked portion (51b) from being damaged by contact with the sealing member (45).

According to the sixth aspect of the present invention, the rotational torque of the rotating brush (51) is generally the same whether the rotating brush (51) is rotated in either direction about the rotational axis, because the sealing portion (45a) extends toward the rotational axis of the rotating brush (51). Thus, according to the sixth aspect of the present invention, it is possible to prevent a malfunction of the rotating brush (51) when the rotating brush (51) is rotated in one direction about the rotational axis.

According to the seventh aspect of the present invention, the sealing member (45) is provided on an inner wall surface of the upper portion (61) in which the brush mechanism (51, 52) is accommodated, the inner wall surface being on the side of the lower portion (62) at which much dust is stored. Thus, the dust in the dust storage container (60) can be effectively prevented from flowing out through the opening (63) by the sealing member (45).

BRIEF DESCRIPTION OF THE DRAWINGS

FIG. 13(A) shows the state during a normal operation, and FIGS. 13(B) and 13(C) show the state during a filter cleaning operation.

DESCRIPTION OF EMBODIMENTS

An embodiment of the present invention will be described in detail hereinafter, based on the drawings. The descriptions in the foregoing embodiment are merely preferred examples in nature, and are not intended to limit the invention, its applications, and use of the invention.

The present embodiment relates to an air conditioner (1) having an indoor unit (3) according to the present invention. According to the air conditioner (1), the indoor unit (3) is mounted on a ceiling in the indoor space. In the following descriptions, a structure of the air conditioner (1) according to the present embodiment will be described first, and a structure of the indoor unit (3) will be described thereafter.

<General Structure>

Figure 1:
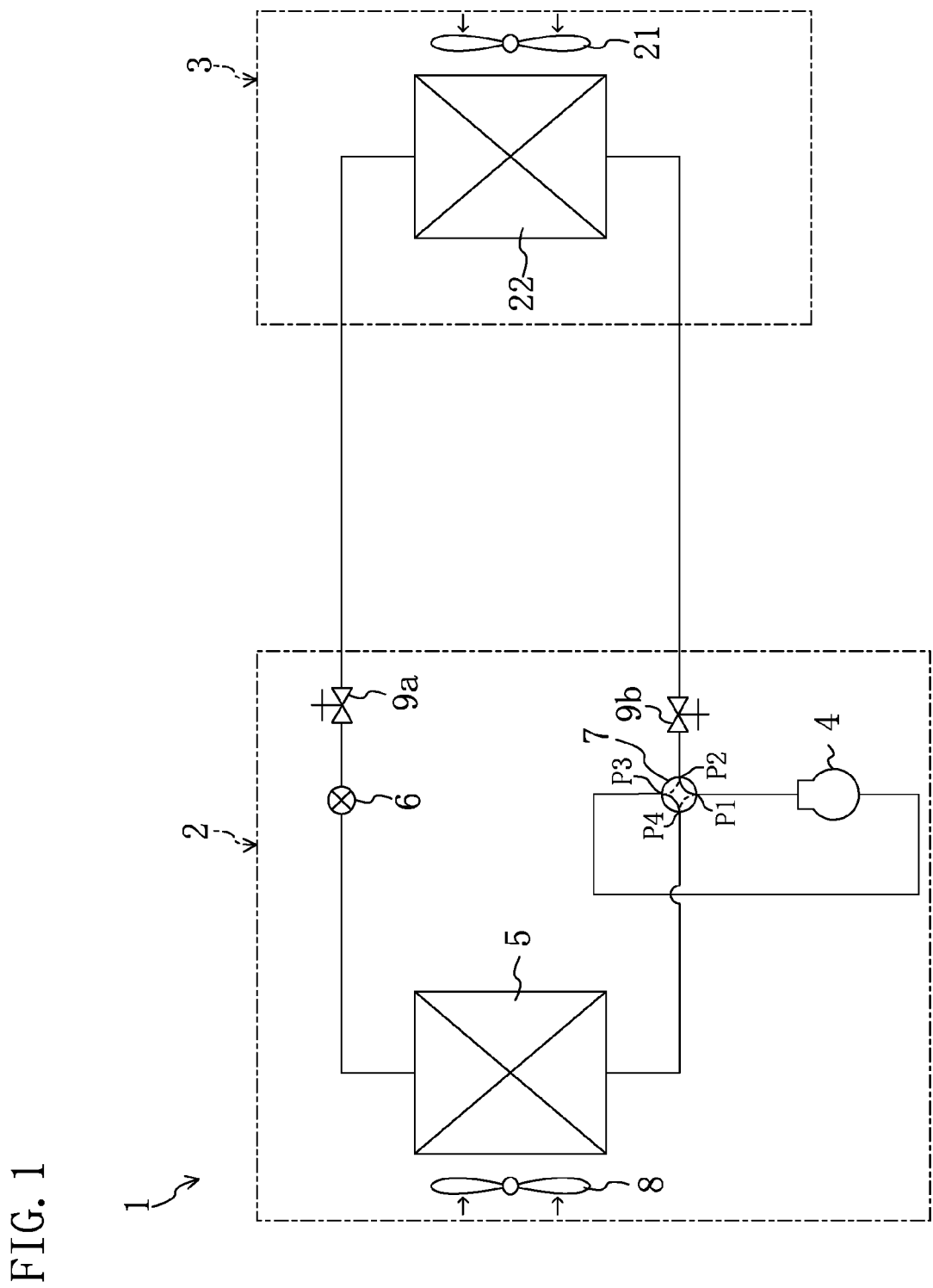
FIG. 1 shows a pipeline for illustrating a structure of an air conditioner having an indoor unit according to the present invention.

As shown in FIG. 1, the air conditioner (1) includes an outdoor unit (2) and an indoor unit (3). A compressor (4), an outdoor heat exchanger (5), an expansion valve (6), a four-way switching valve (7), and an outdoor fan (8) are provided in the outdoor unit (2). An indoor heat exchanger (22) and an indoor fan (21) are provided in the indoor unit (3).

In the outdoor unit (2), the discharge side of the compressor (4) is connected to a first port (P1) of the four-way switching valve (7). The intake side of the compressor (4) is connected to a third port (P3) of the four-way switching valve (7).

The outdoor heat exchanger (5) is a fin-and-tube heat exchanger of cross-fin type. One end of the outdoor heat exchanger (5) is connected to a fourth port (P4) of the four-way switching valve (7). The other end of the outdoor heat exchanger (5) is connected to a liquid side closing valve (9a).

The outdoor fan (8) is located in the vicinity of the outdoor heat exchanger (5).

The outdoor heat exchanger (5) exchanges heat between the outside air taken by the outdoor fan (8) and a refrigerant flowing in a heat-transfer pipe of the heat exchanger (5). An expansion valve (6) whose degree of opening is variable is provided between the outdoor heat exchanger (5) and the liquid side closing valve (9a). Further, a second port (P2) of the four-way switching valve (7) is connected to a gas side closing valve (9b).

The four-way switching valve (7) is capable of switching between a first state (the state as shown in solid line in FIG. 1) in which the first port (P1) and the second port (P2) communicate with each other and in which the third port (P3) and the fourth port (P4) communicate with each other, and a second state (the state as shown in broken line in FIG. 1) in which the first port (P1) and the fourth port (P4) communicate with each other and in which the second port (P2) and the third port (P3) communicate with each other.

The air conditioner (1) performs a heating operation when the four-way switching valve (7) is in the first state, and performs a cooling operation when the four-way switching valve (7) is in the second state. During the heating operation, a vapor compression refrigeration cycle in which the outdoor heat exchanger (5) serves as an evaporator and the indoor heat exchanger (22) serves as a condenser, is performed in the refrigerant circuit shown in FIG. 1. In contrast, during the cooling operation, a vapor compression refrigeration cycle in which the outdoor heat exchanger (5) serves as a condenser and the indoor heat exchanger (22) serves as an evaporator, is performed in the refrigerant circuit shown in FIG. 1.

<Structure of Indoor Unit>

A structure of the indoor unit (3) will be described in detail, based on FIG. 2 and FIG. 3.

Figure 2:
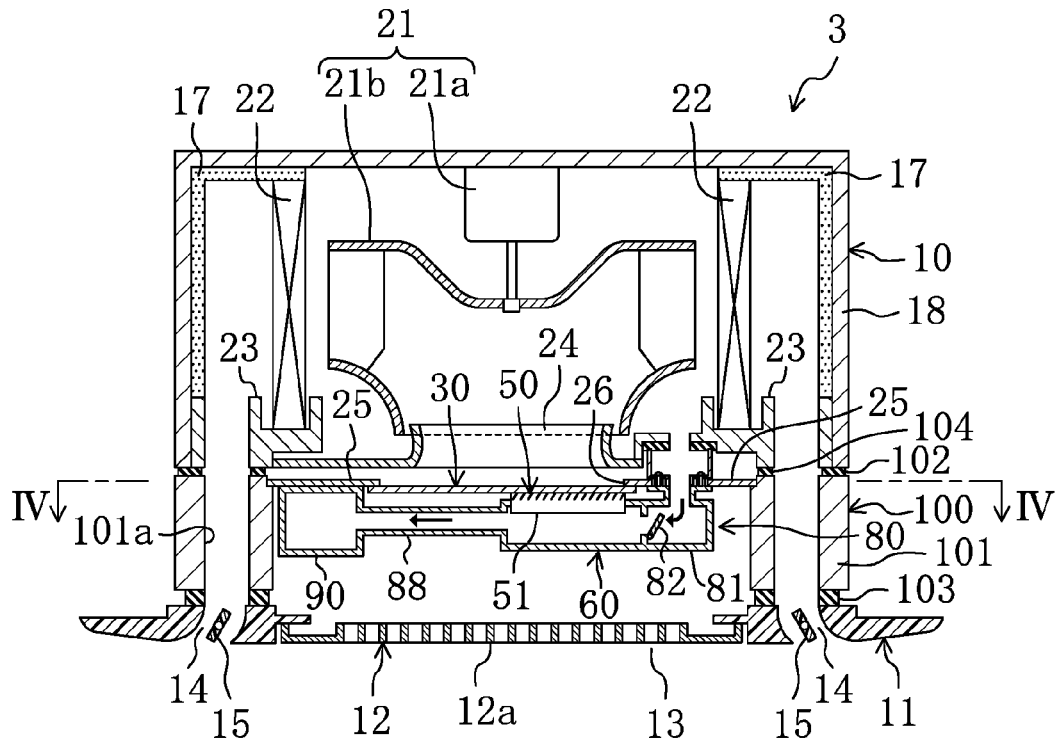
FIG. 2 is a vertical cross section for illustrating a structure inside the indoor unit.

As shown in FIG. 2, the indoor unit (3) includes a main unit (10) having the indoor fan (21) and the indoor heat exchanger (22), a cleaning unit (100) placed on the room side (a lower side) of the main unit (10), and a decorative panel (11) which covers the room side (a lower side) of the cleaning unit (100). That is, the indoor unit (3) is configured by the main unit (10), the cleaning unit (100) and the decorative panel (11) stacked in this order from the top.

The main unit (10) has a box-like main casing (18) which is open toward the room. The indoor fan (21), the indoor heat exchanger (22), a drain pan (23), and a bell mouth (24) are disposed in the main casing (18).

A heat insulation (17) is attached to the inner surface of the main casing (18). The main casing (18) is supported on and suspended from the wall above the ceiling such that the opening of the main casing (18) is positioned on the room side.

The indoor fan (21) is a so-called "turbo fan." As shown in FIG. 2, the indoor fan (21) is located at a generally central location of the main casing (18) of the main unit (10), and positioned above an inlet (13) of the decorative panel (11). The indoor fan (21) has a fan motor (21a) and an impeller (21b). The fan motor (21a) is fixed to the top plate of the main casing (18). The impeller (21b) is connected to the shaft of the fan motor (21a).

The bell mouth (24) is provided under the indoor fan (21) so as to communicate with the inlet (13). In the interior of the indoor unit (3), the bell mouth (24) partitions the space on the upstream side of the indoor heat exchanger (22) into a space on the indoor fan (21) side and a space on the inlet grill (12) side, as shown in FIG. 2.

Further, the ventilation partition plate configured by the bell mouth (24) and the drain pan (23), is provided with an opening (not shown) at a location corresponding to one of four corners of the rectangular parallelepiped main casing (18). The opening forms an introduction opening (86d) of an introduction duct (86) (see FIG. 11).

In the case where the cleaning unit (100) is not provided (in the case where the indoor unit (3) is configured by the main unit (10) and the decorative panel (11)), the opening is closed by a cover from below (not shown) so that the air blown by the indoor fan (21) will not escape from the opening.

The indoor heat exchanger (22) has a generally square shape in plan view, and is arranged in the main casing (18) so as to surround the indoor fan (21). The indoor heat exchanger (22) exchanges heat between the room air taken by the indoor fan (21) (blown air) and the refrigerant flowing in the heat-transfer pipe of the heat exchanger (22).

The drain pan (23) is placed under the indoor heat exchanger (22). The drain pan (23) is for receiving drain water generated as a result of condensation of water vapor in the air at the indoor heat exchanger (22). The drain pan (23) is provided with a drain pump (not shown) for draining drain water. Further, the drain pan (23) is inclined so that the drain water is collected at a place where the drain pump is provided.

The cleaning unit (100) includes a generally rectangular chamber casing (101) in plan view, in which an air filter (30), a dust removal mechanism (50), a dust transfer mechanism (80), and a dust collecting box (90) (a dust collecting device), etc. are disposed. The cleaning unit (100) is configured to remove dust which adheres to the air filter (30) located on the intake side of the indoor fan (21) by using the dust removal mechanism (50), and transfer the removed dust into the dust collecting box (90) by using the dust transfer mechanism (80). The dust removed from the air filter (30) is stored in the dust collecting box (90) in the end.

The chamber casing (101) is configured to have the same size as the size of the main casing (18) of the main unit (10) in plan view. The chamber casing (101) is located on the room side of the main casing (18), with a sealing member (102) sandwiched between the main casing (18) and the chamber casing (101), as shown in FIG. 2. Further, a decorative panel (11) is attached to the room side of the chamber casing (101), with a sealing member (103) sandwiched between the chamber casing (101) and the decorative panel (11).

Further, the chamber casing (101) is provided with four air paths (101a) along each side of the chamber casing (101). Each air path (101a) communicates with the space in the main casing (18) that is created in the outer peripheral region of the indoor heat exchanger (22). Air having passed through the indoor heat exchanger (22) flows through each of the air paths (101a). The air having passed through the air paths (101a) is supplied into the indoor space through the outlet (14) of the decorative panel (11). In the chamber casing (101), as shown in FIG. 2, the inner side portions of the air paths (101a) support the drain pan (23) from below, with a sealing member (104) sandwiched therebetween.

Figure 3:
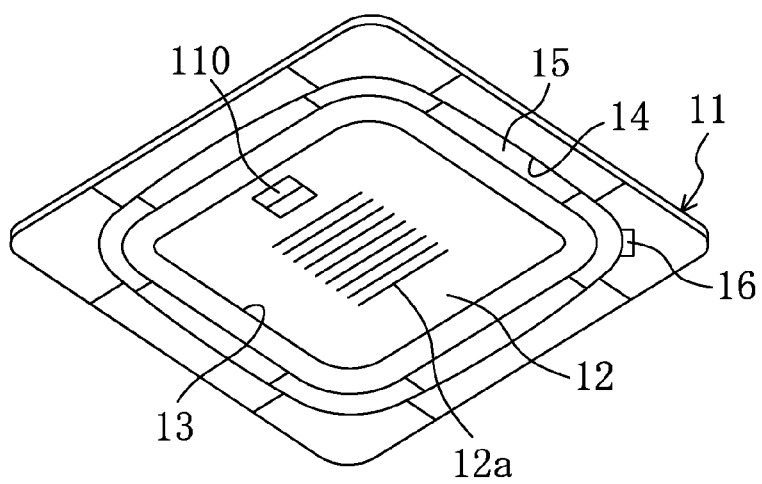
FIG. 3 is an oblique view of a decorative panel viewed from the room side.

As shown in FIG. 3, the decorative panel (11) has a rectangular, plate-like shape in plan view. The decorative panel (11) is slightly larger in size than the main casing (18) and the chamber casing (101) in plan view. As described above, the decorative panel (11) is attached to the chamber casing (101) so as to cover the bottom side of the chamber casing (101), with the sealing member (103) sandwiched between the chamber casing (101) and the decorative panel (11). The decorative panel (11) is exposed to the indoor space.

Further, the decorative panel (11) is provided with one inlet (13) and four outlets (14) as shown in FIG. 3. The inlet (13) has a generally rectangular shape, and is disposed in a central portion of the decorative panel (11). An inlet grill (12) having a slit portion (12a) is attached to the inlet (13). The outlets (14) have an elongated rectangular shape, and are provided along sides of the decorative panel (11) so as to correspond to the air paths (101a) of the cleaning unit (100). Further, each outlet (14) is provided with a wind direction control plate (15). The wind direction control plate (15) is rotatable and capable of adjusting the wind direction (blowout direction).

The inlet grill (12) is provided with a nozzle insertion portion (110) for inserting a nozzle of a cleaner. The nozzle of the cleaner can be inserted in the nozzle insertion portion (110) so that the dust stored in the dust collecting box (90) of the cleaning unit (100) can be collected by the cleaner.

Further, the decorative panel (11) is provided with an LED (16) which lights, for example, when the amount of dust stored in the dust collecting box (90) of the cleaning unit (100) exceeds a predetermined amount, or when the dust removal mechanism (50) is removing the dust adhering to the air filter (30).

<Structure of Cleaning Unit>

Now, an internal structure of the cleaning unit (100) will be described in detail, with reference to drawings FIGS. 4-12.

The cleaning unit (100) is for cleaning the air filter (30) located at the intake side of the indoor fan (21). The cleaning unit (100) includes the chamber casing (101) having a generally rectangular shape in plan view, in which the air filter (30), the dust removal mechanism (50), the dust transfer mechanism (80), the dust collecting box (90), etc. are disposed.

Also, the cleaning unit (100) is provided with the partition plate (25) covering the lower side of the bell mouth (24). The partition plate (25) partitions a space between the bell mouth (24) and the inlet grill (12) into upper and lower spaces as shown, for example, in FIG. 2. That is, the partition plate (25) separates the space on the upstream side of the indoor fan (21) into a space on the indoor fan (21) side, the space including the bell mouth (24), and a space on the inlet grill (12) side.

Figure 5:
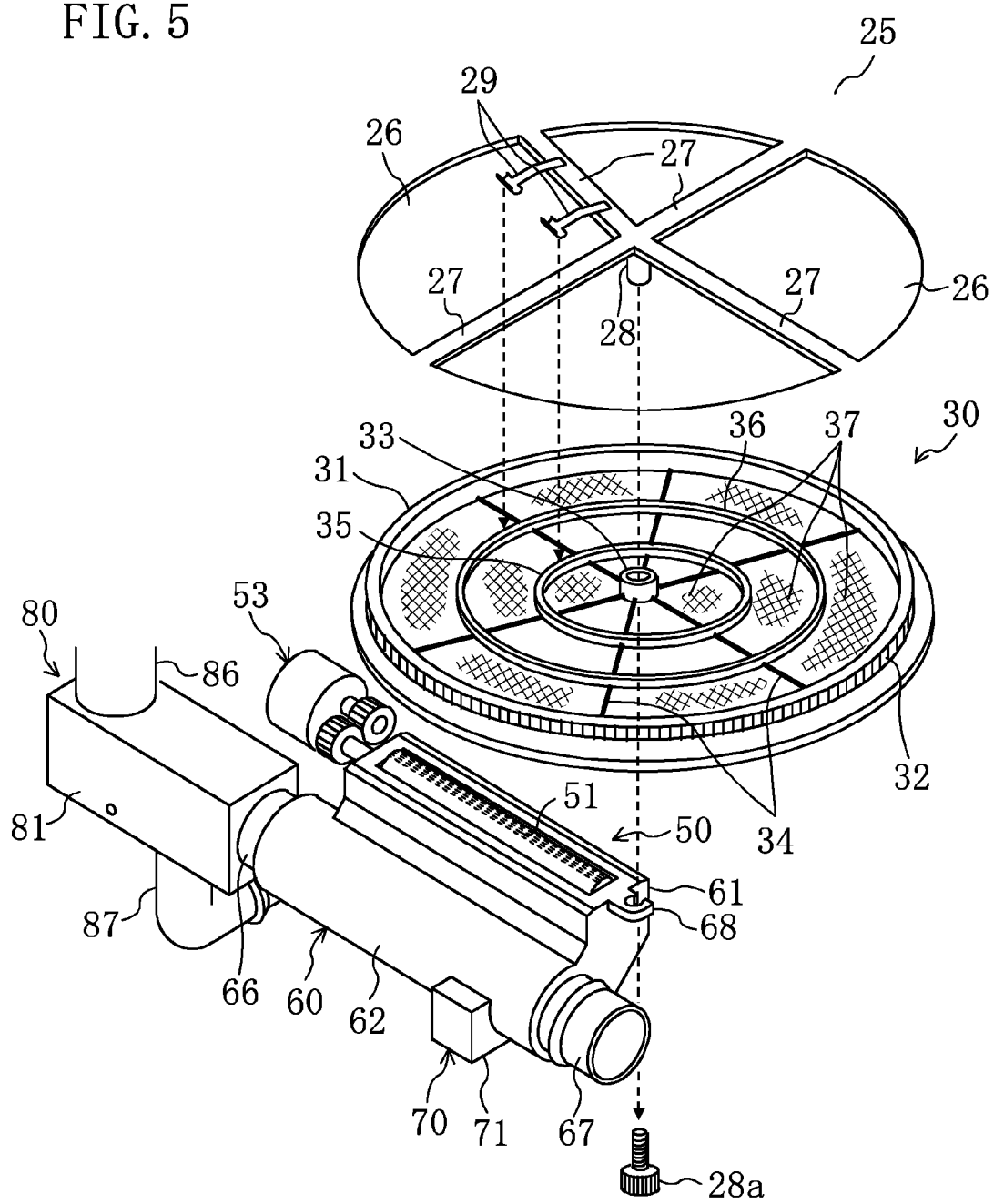
FIG. 5 is an oblique view for illustrating structures of an air vent in a partition plate, an air filter, and a dust storage container.

An air vent (26) for allowing air taken through the inlet (13) to flow into the bell mouth (24) is provided in the central portion of the partition plate (25), as shown in FIG. 5. The air filter (30) is located so as to cover the air vent (26) from below. That is, the partition plate (25) is provided so as to close the space between the inner surface of the side wall of the chamber casing (101) and the air filter (30). In this structure, all the air taken through the inlet (13) passes through the air filter (30). Thus, it is possible to prevent the dust contained in the air on the upstream side of the partition plate (25) from flowing into the downstream side of the partition plate (25) without being captured by the air filter (30).

A shown in FIG. 5, the air vent (26) is divided into sectors by four radial beam members (27) extending in a radial direction. The radial beam members (27) are connected to each other at the center of the circular air vent (26). The center of the air vent (26) is provided with a cylindrical, filter turning shaft (28) which protrudes downward from the center of the air vent (26). The filter turning shaft (28) is a rotating shaft for rotating the air filter (30). Further, one of the radial beam members (27) is provided with two filter pressing members (29) for pressing the air filter (30) from above.

As shown in FIG. 5, the air filter (30) has a disk-like shape, and is attached to the partition plate (25) from below the air vent (26), The outer diameter of the air filter (30) is larger than the outer diameters of the bell mouth (24) and the air vent (26).

Specifically, the air filter (30) includes a ring-shaped filter body (31) and a mesh member (37). The outer peripheral surface of the filter body (31) is provided with a gear (32). A center portion of the filter body (31) is provided with a cylindrical shaft insertion portion (33) supported by six radial ribs (34) which extend in a radial direction. In other words, each radial rib (34) extends radially from the shaft insertion portion (33) to be connected to the filter body (31). Further, the inner side of the filter body (31) is provided with a ring-shaped inner circumferential rib (35) and an outer circumferential rib (36) which are concentric with the filter body (31). The diameter of the outer circumferential rib (36) is larger than the diameter of the inner circumferential rib (35). Here, as shown in FIG. 6, the inner diameter of the shaft insertion portion (33) is larger than the diameter of the filter turning shaft (28) and the diameter of the head of a fastening screw (28a) described later.

The mesh member (37) is stretched over the filter body (31). The air taken through the inlet (13) passes through the mesh member (37) of the air filter (30), and flows into the bell mouth (24). Here, the dust in the air is captured by the mesh member (37).

Further, the air filter (30) is biased downward by the filter pressing members (29) which abut on each upper surface of the ring-shaped circumferential ribs (35, 36). Thus, the air filter (30) is pressed against a rotating brush (51), described later. With this structure, it is possible to improve the dust removal efficiency of the dust removal mechanism (50).

Figure 6:
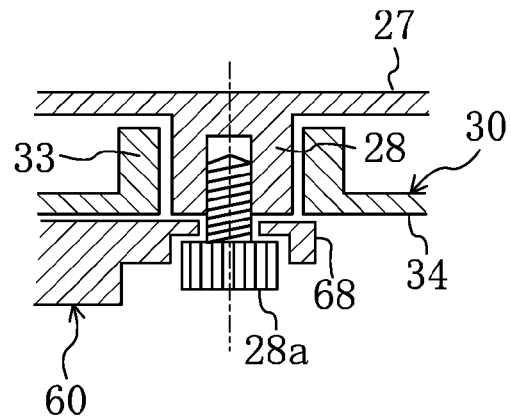
FIG. 6 is a cross section for illustrating an attachment structure of the air filter.

As shown in FIGS. 5 and 6, the shaft insertion portion (33) of the air filter (30) is rotatably fitted to the filter turning shaft (28). A dust storage container (60) of the dust removal mechanism (50) is located under the air filter (30). The air filter (30) is fitted to the filter turning shaft (28), and in this state, a filter attachment portion (68) of the dust storage container (60), described later, and the filter turning shaft (28) are fastened to each other with the fastening screw (28a). This structure allows the air filter (30) to be kept between the partition plate (25) and the dust storage container (60).

Figure 4:
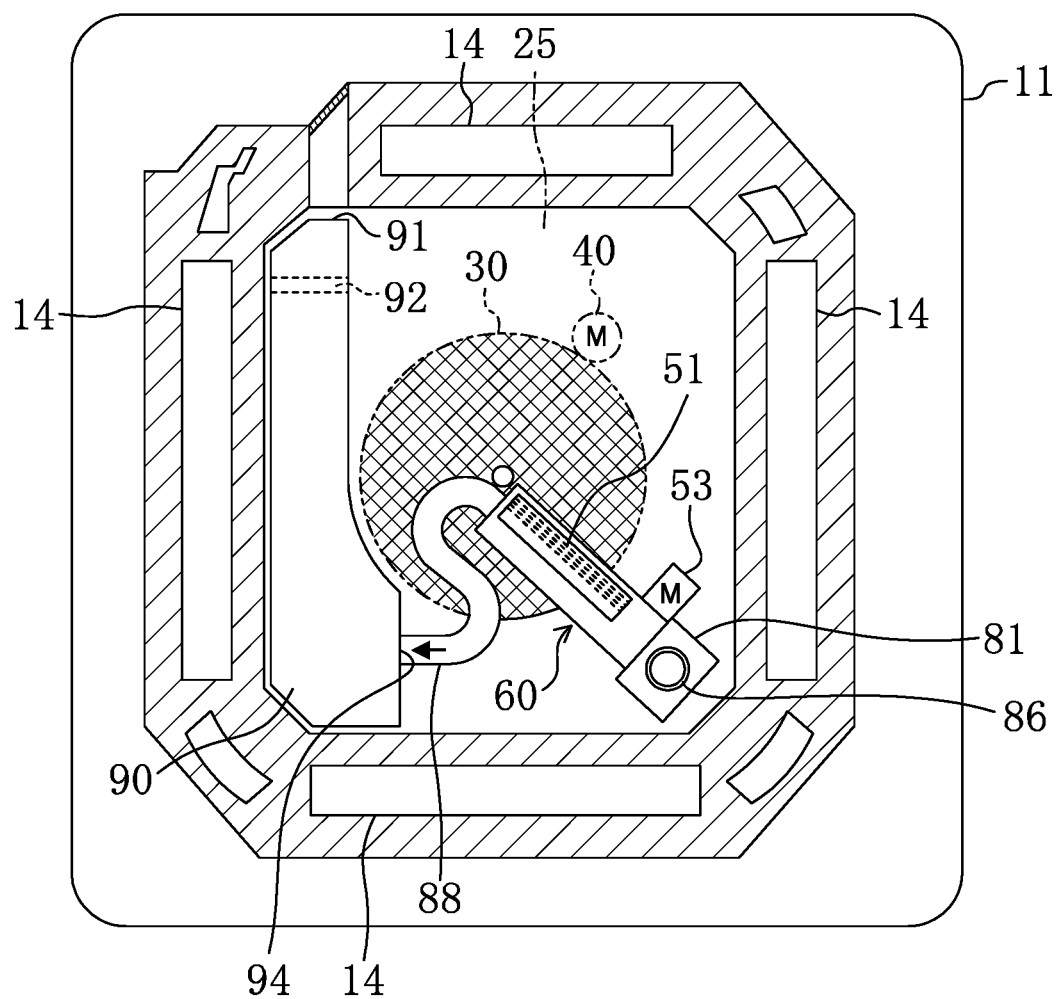
FIG. 4 is a cross section taken along the line IV-IV in FIG. 2.
Figure 7:
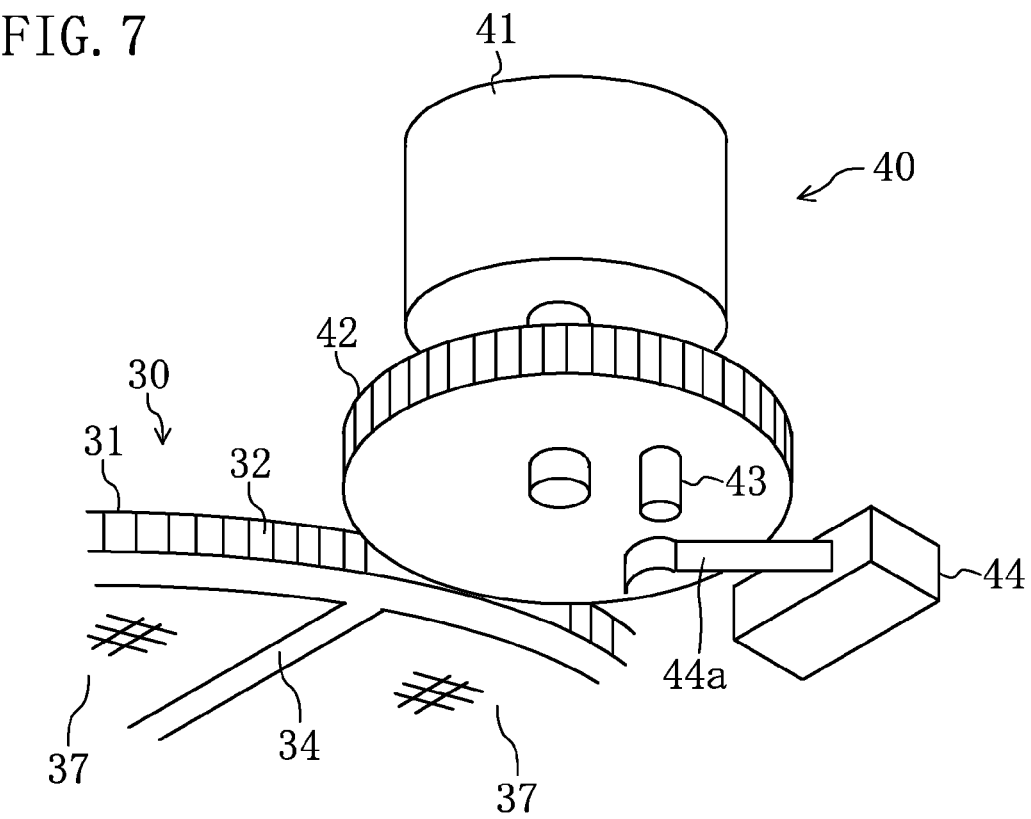
FIG. 7 is an oblique view for illustrating a structure of a filter drive device.

As shown in FIGS. 4 and 7, a filter drive device (40) for rotating the air filter (30) is provided at a location in the vicinity of the air filter (30). The filter drive device (40) includes a filter drive motor (41) and a limit switch (44) as shown in FIG. 7. The drive shaft of the filter drive motor (41) is provided with a drive gear (42), which engages with the gear (32) of the air filter (30). One end surface of the drive gear (42) (the lower surface in the drawing) is provided with a switch actuating portion (43) which is a protrusion. The switch actuating portion (43) abuts against a lever (44a) of the limit switch (44) by the rotation of the drive gear (42), and thereby moves the lever (44a). When the lever (44a) moves, the limit switch (44) detects the movement of the lever (44a). In other words, the switch actuating portion (43) and the limit switch (44) detect the rotation of the drive gear (42), and therefore, it is possible to detect timing of actuation of the dust removal mechanism (50) according to the number of rotations of the drive gear (42), or detect a malfunction in the case where the drive gear (42) does not rotate.

Next, the dust removal mechanism (50), the storage amount detection mechanism (70), the dust transfer mechanism (80), and the dust collecting box (90) will be described.

Figure 8:
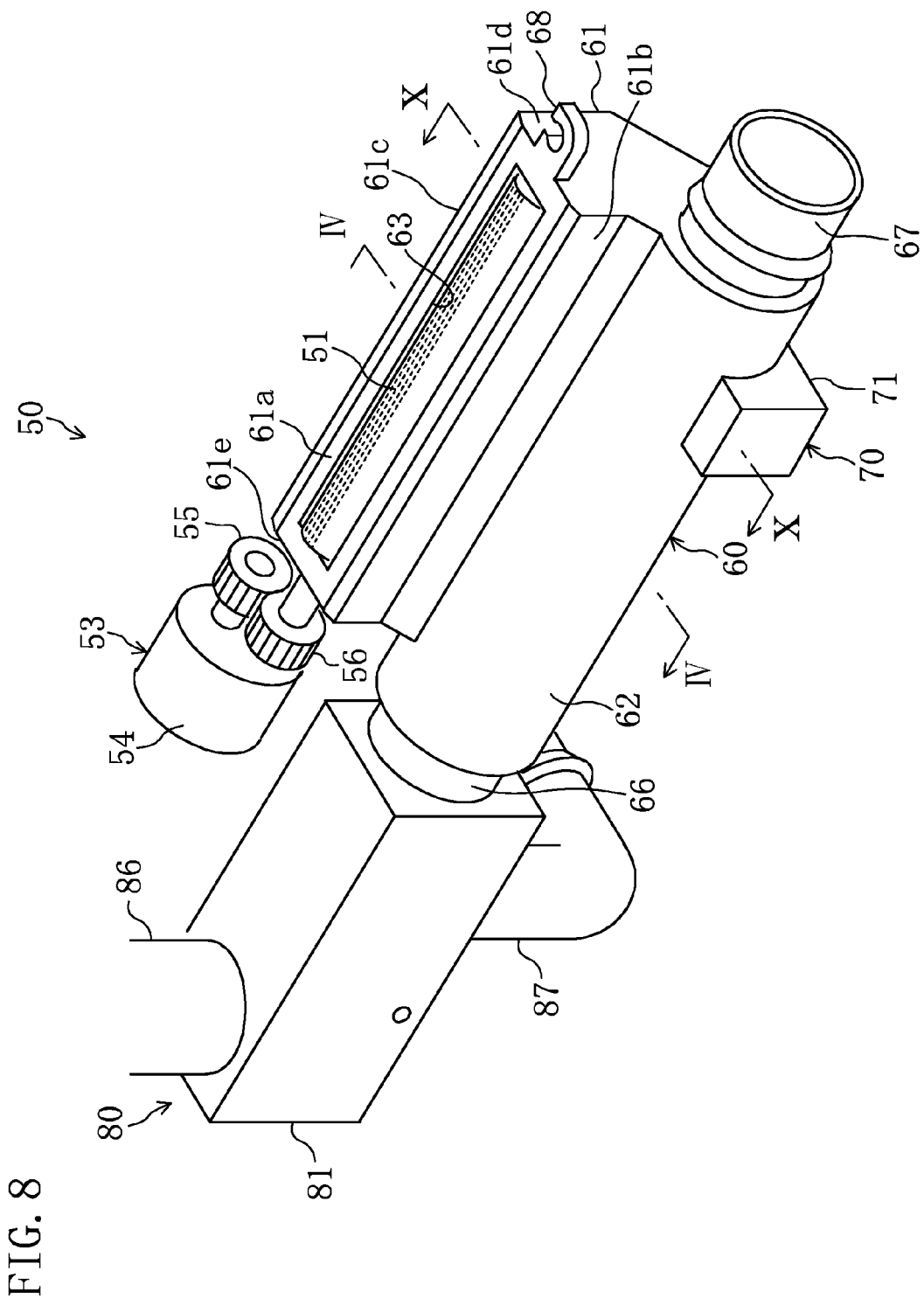
FIG. 8 shows a dust removal mechanism and a dust storage container viewed obliquely from above.
Figure 10:
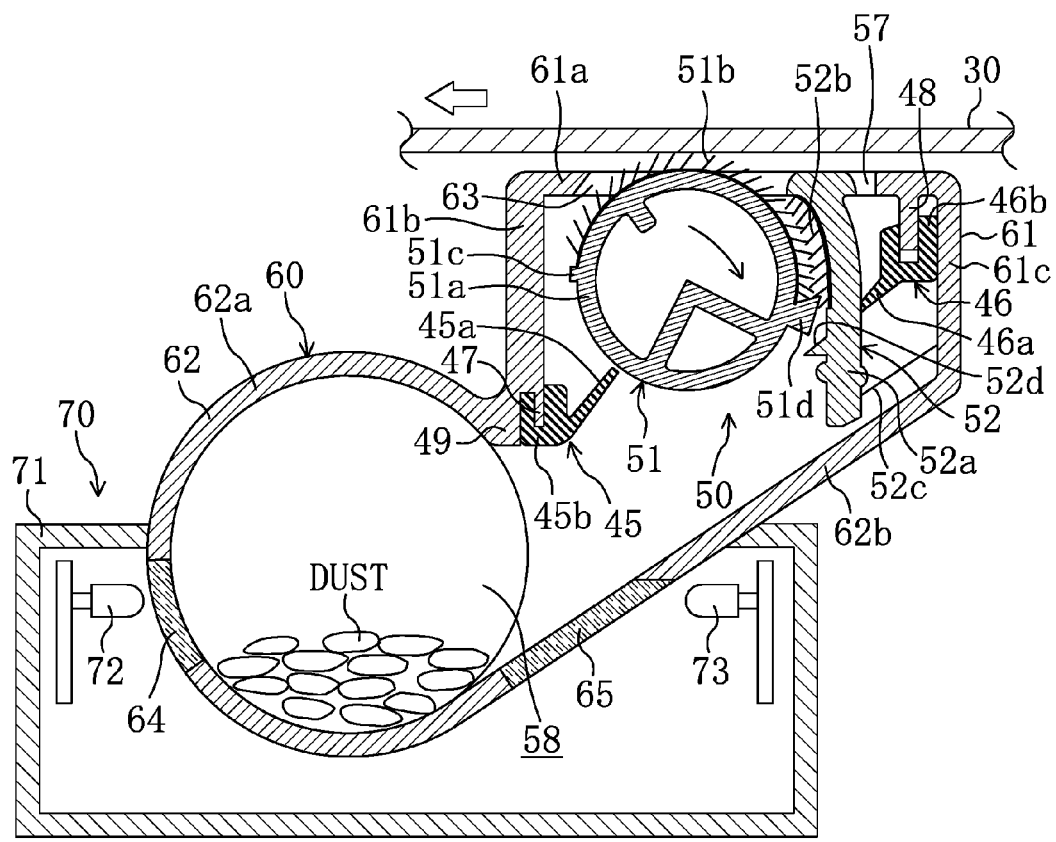
FIG. 10 is a cross section taken along the line X-X in FIG. 8.

The dust removal mechanism (50) is for removing dust captured by the air filter (30). The dust removal mechanism (50) includes, as shown in FIGS. 8 and 10, a rotating brush (51), a cleaning brush (52), a brush drive mechanism (53), and a dust storage container (60) for temporarily storing the removed dust. The rotating brush (51) and the cleaning brush (52) are provided in an opening (63) of the dust storage container (60), and form a brush mechanism (51, 52).

The rotating brush (51) includes a cylindrical shaft (51a) and a flocked portion (51b) located on the outer peripheral surface of the shaft (51a). The shaft (51a) forms a rod-like member (51a) and is rotatable. The flocked portion (51b) is provided only in a region of the outer surface of the rod-like member (51a) in a circumferential direction. In this region, the flocked portion (51b) is provided across the axial direction of the shaft (51a).

The flocked portion (51b) is formed by providing bristles on a base material. Specifically, the flocked portion (51b) is made of so called "pile fabric." The pile fabric is a plush material made on a base fabric in which yarn (pile yarn) is interwoven, and the length of the pile is relatively short. Further, the pile fabric is an inclined pile material in which pile is inclined in a certain direction. In the present embodiment, the piles of the flocked portion (51b) in FIG. 10 are inclined in a clockwise direction (toward an adhesion preventing protrusion (51d), described later) from the base material.

To remove the dust on the air filter (30), the air filter (30) is rotated in the direction of arrow shown in FIG. 10. When the air filter (30) is rotated in this direction, the direction along which the piles of the flocked portion (51b) are inclined is opposite to the moving direction of the contact portion of the air filter (30). Thus, the dust adhering to the mesh member (37) can be efficiently scraped off.

The outer peripheral surface of the shaft (51a) is provided with a positioning protrusion (51c) and an adhesion preventing protrusion (51d) which extend across an axial direction. These protrusions (51c, 51d) enable positioning of the flocked portion (51b) on the shaft (51a) in a circumferential direction.

The positioning protrusion (51c) is provided for the positioning of the end, of the ends of the flocked portion (51b) of the rotating brush (51) in the circumferential direction (rotational direction), that is on the opposite side of the cleaning brush (52) in the state in which the flocked portion (51b) is removing the dust on the air filter (30) (the state shown in FIG. 10). The positioning protrusion (51c) has a generally rectangular cross section, and a height which enables the positioning of a base fabric (shown in thick line in the drawing) that is a base of the flocked portion (51b).

The adhesion preventing protrusion (51d) is provided for the positioning of the end, of the both ends of the flocked portion (51b) of the rotating brush (51) in the shaft circumferential direction (rotational direction), that is on the side closer to the cleaning brush (52) (the end of the cleaning brush side) in the state in which the flocked portion (51b) is removing the dust on the air filter (30) (the state shown in FIG. 10). The adhesion preventing protrusion (51d) is provided so as to cover the end of the flocked portion (51b).

The cleaning brush (52) is a brush cleaning member (52) for removing dust which adheres to the flocked portion (51b) due to contact with the flocked portion (51b). The cleaning brush (52) is provided along the axial direction of the rotating brush (51). The cleaning brush (52) is provided on a side of the rotating brush (51) such that the cleaning brush (52) can come in contact with the flocked portion (51b) across the entire length of the flocked portion (51b). The cleaning brush (52) includes a plate-like member (52a), the flocked portion (52b) provided on a surface of the plate-like member (52a), and a spring member (52c) by which the plate-like member (52a) is elastically supported on the dust storage container (60).

The plate-like member (52a) has a length that is equal to the length of the shaft (51a) of the rotating brush (51). A front surface of the plate-like member (52a) is opposed to the outer peripheral surface of the rotating brush (51), with a predetermined space therebetween. An upper portion of the plate-like member (52a) has an arc shape so that the upper portion can be along the outer peripheral surface of the shaft (51a) of the rotating brush (51). The flocked portion (52b) is stuck to the arc upper portion of the plate-like member (52a) across the length direction of the plate-like member (52a).

The flocked portion (52b) of the cleaning brush (52) is made of a pile fabric (inclined piles) like the flocked portion (51b) of rotating brush (51). The piles of the flocked portion (52b) are inclined obliquely downward from the plate-like member (52a) as shown in FIG. 10. That is, the piles of the flocked portion (52b) are inclined in a direction opposite to the rotational direction of the rotating brush (51) when the rotating brush (51) rotates in a counterclockwise direction in FIG. 10. Thus, the dust adhering to the flocked portion (51b) of the rotating brush (51) can be removed by the flocked portion (52b) of the cleaning brush (52).

The flocked portions (51b, 52b) of the rotating brush (51) and the cleaning brush (52) are configured to have piles that extend downward (toward the inside of the dust storage container (60)) in the state in which the flocked portions (51b, 52b) come in contact to each other (the state as shown in FIG. 15(D)). With this structure, the dust adhering to the rotating brush (51) and the cleaning brush (52) can be efficiently collected into the dust storage container (60).

Further, a protrusion (52d) (a fixed side protrusion) which protrudes toward the rotating brush (51) is provided at a lower portion of the plate-like member (52a). The protrusion (52d) is located on the lower side of the flocked portion (52b). The protrusion (52d) has a generally triangular cross section. The protrusion (52d) protrudes to the vicinity of the locus of a protruding end of the adhesion preventing protrusion (51d) of the rotating brush (51) that passes by the protrusion (52d). In other words, the height of the protrusion (52d) is set to a height which leaves narrow space between the adhesion preventing protrusion (51d) and the protrusion (52d) when the adhesion preventing protrusion (51d) is nearest to the protrusion (52d).

The spring member (52c) is made of a plate spring. One end of the spring member (52c) is connected to a lower end portion of the plate-like member (52a), and the other end of the spring member (52c) is connected to an inner wall surface of a second side face portion (61c) of the dust storage container (60). The lower end portion of the plate-like member (52a) is supported by the spring member (52c).

As shown in FIG. 4, each of the rotating brush (51) and the cleaning brush (52) which form the above-described brush mechanism has a length that is equal to or greater than the radius of the circular air filter (30). The rotating brush (51) and the cleaning brush (52) extend radially outward from the center of the circular air filter (30). That is, the dust removal mechanism (50) is positioned so as to extend in a radial direction of the air filter (30).

Figure 9:
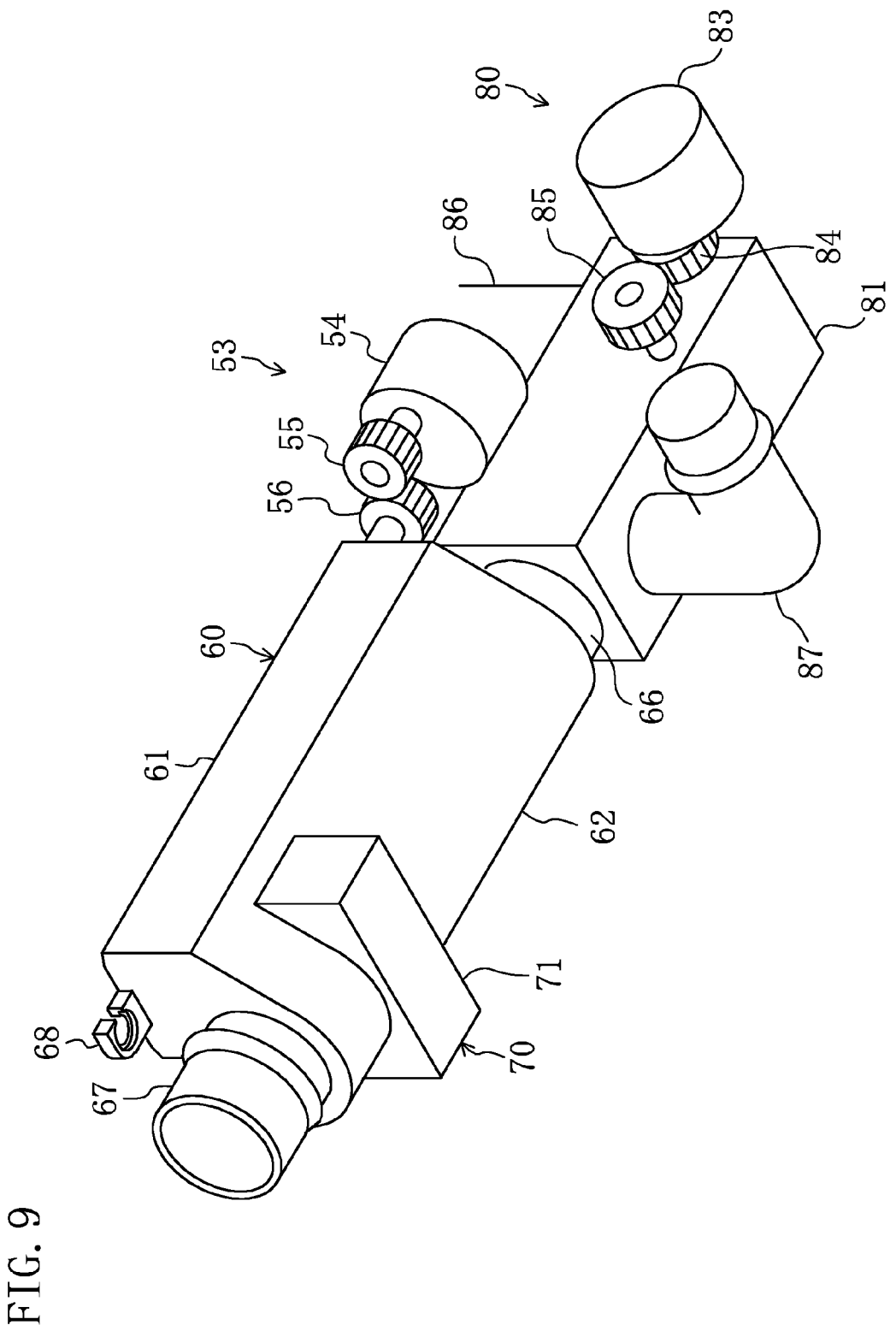
FIG. 9 shows a dust storage container viewed obliquely from below.

The brush drive mechanism (53) includes a brush drive motor (54), and a drive gear (55) and a driven gear (56) which are engaged with each other, as shown in FIG. 8 and FIG. 9. The drive gear (55) is attached to a drive shaft of the brush drive motor (54). The driven gear (56) is attached to one end of the shaft (51a) of the rotating brush (51). In the brush drive mechanism (53), power of the brush drive motor (54) is transferred to the rotating brush (51) by way of the drive gear (55) and the driven gear (56), thereby rotating the rotating brush (51).

The brush drive mechanism (53) performs a brush cleaning operation for cleaning the flocked portion (51b) of the rotating brush (51). In the brush cleaning operation, the brush drive mechanism (53) first rotates the rotating brush (51) in a clockwise direction in FIG. 10 only at a predetermined rotation angle, and thereafter rotates the rotating brush (51) in a counterclockwise direction in FIG. 10. The dust adhering to the flocked portion (51b) of the rotating brush (51) adheres to the flocked portion (52b) of the cleaning brush (52) when the rotating brush (51) is rotated in a counterclockwise direction in FIG. 10. After that, the brush drive mechanism (53) again rotates the rotating brush (51) in a clockwise direction in FIG. 10. At this rotation, the dust adhering to the flocked portion (52b) of the cleaning brush (52) is scraped off by the flocked portion (51b) of the rotating brush (51), and falls in the storage section (62) of the dust storage container (60). In the brush cleaning operation, the rotating brush (51) is rotated in opposite directions about the rotational axis by changing the rotational direction of the brush drive motor (54). The brush cleaning operation will be described in detail later.

Here, in the brush cleaning operation, dust may adhere to an end portion of the flocked portion (51b) of the rotating brush (51) (a leading end portion of the flocked portion (51b) when the rotating brush (51) is rotated in a clockwise direction in FIG. 10). After the brush cleaning operation is repeated multiple times, dust may be accumulated at the end portion like a band. Without the adhesion preventing protrusion (51d), problems may be caused in which dust accumulated like a band at the end portion of the flocked portion (51b) along the outer peripheral surface of the shaft (51a) sticks to the shaft (51a), or dust cannot be easily removed from the rotating brush (51), etc.

On the other hand, according to the present embodiment, the adhesion preventing protrusion (51d) prevents the dust which adheres to the end portion of the flocked portion (51b) from accumulating along the surface of the shaft (51a). The dust elongates, separating from the surface of the rotating brush (51) as shown in FIG. 15(D). Thus, the adhesion preventing protrusion (51d) can prevent dust from sticking to the shaft (51a), and can prevent the situation in which dust cannot be easily removed from the rotating brush (51).

Further, according to the present embodiment, the adhesion preventing protrusion (51d) passes by the protrusion (52d) of the cleaning brush (52) during the rotation of the rotating brush (51), with narrow space between a front surface of the protrusion (52d) and the adhesion preventing protrusion (51d). Thus, it is possible to compress and elongate the band-like dust between the adhesion preventing protrusion (51d) and the protrusion (52d) of the cleaning brush (52), and possible to easily pull the dust apart into pieces having a predetermined size. Moreover, compressing the dust as described above enables a reduction in volume of the dust, and therefore, it is possible to store much dust in the dust storage container (60). Furthermore, since the dust can be pulled apart into small pieces, it is possible to easily transfer the dust from the dust storage container (60) to the dust collecting box (90).

The dust storage container (60) is a container in which dust removed from the air filter (30) by the rotating brush (51) is temporarily stored. The dust storage container (60) stores the dust removed from the rotating brush (51) by the cleaning brush (52). As shown in FIG. 8, the dust storage container (60) has a columnar shape as a whole. The dust storage container (60) is positioned such that its longitudinal direction is horizontal. Further, the rotating brush (51) is accommodated in the dust storage container (60). An opening (63) for exposing the flocked portion (51b) of the rotating brush (51) to the outside of the dust storage container (60) is formed in the upper surface of the dust storage container (60).

Specifically, as shown in FIG. 10, a cross section of the dust storage container (60) taken along the direction orthogonal to the longitudinal direction (a cross-sectional view) shows that an upper portion (61) of the dust storage container (60) forms a removal section (61) in which the rotating brush (51) for removing dust is accommodated, and that a lower portion (62) of the dust storage container (60) forms a storage section (62) for storing the dust. The storage section (62) of the dust storage container (60) protrudes like an arc from the lower end of the removal section (61) to a lateral side (left side in FIG. 10).

The removal section (61) has a generally rectangular, box-like shape whose lower end is open. The removal section (61) extends along a longitudinal direction of the dust storage container (60). The removal section (61) includes, as shown in FIG. 8 and FIG. 10, an upper face portion (61a), first and second side face portions (61b, 61c) which extend downward from both ends of the upper face portion (61a) along the short dimension (the width) of the upper face portion (61a), and first and second end face portions (61d, 61e) which extend downward from both ends of the upper face portion (61a) along the longitudinal dimension of the upper face portion (61a). In the removal section (61), the side face portion on the side from which the storage section (62) protrudes (i.e., left side in FIG. 10) forms the first side face portion (61b), and the side face portion located opposite to the first side face portion (61b) with respect to the rotating brush (51) forms the second side face portion (61c). The height of the first side face portion (61b) is higher than the height of the second side face portion (61c).

The opening (63) is formed in the upper face portion (61a). The opening (63) has a rectangular shape. The opening (63) extends in a longitudinal direction of the removal section (61). The rotating brush (51) is positioned in the opening (63). The axial direction of the shaft (51a) is the same as the longitudinal direction of the opening (63). The rotating brush (51) is positioned such that the flocked portion (51b) can be exposed to the outside of the opening (63). The both ends of the shaft (51a) are supported by the first and second end face portion (61d, 61e) of the removal section (61), respectively.

Not only the rotating brush (51), but also the cleaning brush (52) is accommodated in the removal section (61). That is, the brush mechanism (51, 52) is accommodated in the removal section (61). The cleaning brush (52) is located between the outer peripheral surface of the shaft (51a) and the inner wall surface of the second side face portion (61c). The upper end portion of the plate-like member (52a) of the cleaning brush (52) is located at the opening (63). Suppose the rotating brush (51) side of the cleaning brush (52) is a front side, the opening (63) allows back-and-forth movements of the upper end portion of the plate-like member (52a).

As shown in FIG. 10, the storage section (62) has a generally C-shaped protrusion portion (62a) and a plate-like inclined surface portion (62b), in cross section. The upper end portion of the protrusion portion (62a) is connected to the lower end of the first side face portion (61b). The outer surface of one side of the dust storage container (60) is such that the protrusion portion (62a) protrudes outward like an arc, having the boundary between the first side face portion (61b) and the protrusion portion (62a) as a bending portion. On the other hand, the lower end portion of the protrusion portion (62a) is connected to the lower end of the inclined surface portion (62b) located under the rotating brush (51). The upper end of the inclined surface portion (62b) is connected to the lower end of the second side face portion (61c). The outer surface of the other side of the dust storage container (60) is bent to form an elbow-shaped portion, having the boundary between the second side face portion (61c) and the inclined surface portion (62b) as a bending portion.

In the dust storage container (60), the dust removed from the rotating brush (51) falls on the inclined surface portion (62b), and is introduced into the protrusion portion (62a) due to the inclination of the inclined surface portion (62b). In the dust storage container (60), much of the dust removed from the rotating brush (51) is stored in the protrusion portion (62a). The space in the protrusion portion (62a) forms a storage space (58) in which dust is stored.

Further, as shown in FIG. 8, the length of the inclined surface portion (62b) is equal to the length of the removal section (61) in a longitudinal direction. The length of the protrusion portion (62a) is longer than the length of the removal section (61) in a longitudinal direction. The protrusion portion (62a) is open at both end portions (66, 67) along its longitudinal direction. A damper box (81), described later, is connected to the first end portion (66) of the protrusion portion (62a), and a transfer duct (88), described later, is connected to the second end portion (67).

Here, according to the present embodiment, not only the air filter (30), but also the dust storage container (60) are located at the intake side of the indoor fan (21). Thus, the indoor fan (21) tries to draw air in the dust storage container (60) during the operation of the indoor fan (21). If the indoor fan (21) draws the air in the dust storage container (60), an airflow flowing from the storage space (58) to the opening (63) is formed in the dust storage container (60), and the dust in the storage space (58) may flow out of the dust storage container (60) through the opening (63) together with the air. In particular, according to the present embodiment, the dust collecting box (90) which communicates with the dust storage container (60) is provided with a discharge opening (91) as shown in FIG. 4, and therefore, an airflow flowing toward the opening (63) is easily generated in the dust storage container (60).

If the indoor fan (21) draws the air in the dust storage container (60), the dust stored in the dust collecting box (90) and the dust storage container (60) may flow out through the opening (63) together with the air which has flowed in through the discharge opening (91). Moreover, according to the present embodiment, band-like dust is pulled apart into pieces by the adhesion preventing protrusion (51d) and the protrusion (52d) of the cleaning brush (52), and therefore, the pieces of the dust may flow out through the opening (63).

In view of this, according to the present embodiment, a first sealing member (45) and a second sealing member (46) are provided in the dust storage container (60), as shown in FIG. 10, to prevent the dust in the dust storage container (60) from flowing out through the opening (63). Both of the first sealing member (45) and the second sealing member (46) are located in the dust storage container (60) between the storage space (58) and the opening (63), and attached to the inner surface of the dust storage container (60) so as to seal the space between the inner wall surface of the dust storage container (60) and the brush mechanism (51, 52). Both of the first sealing member (45) and the second sealing member (46) extend from the inner wall surface of the first end face portion (61d) of the removal section (61) to the inner wall surface of the second end face portion (61e) of the removal section (61). In other words, the first sealing member (45) and the second sealing member (46) seal the space between the inner wall surface of the dust storage container (60) and the brush mechanism (51, 52) across the longitudinal direction of the dust storage container (60).

The first sealing member (45) is a member for sealing the space between the inner wall surface of the first side face portion (61b) and the outer peripheral surface of the rotating brush (51). As shown in FIG. 10, the first sealing member (45) is provided on the inner wall surface of the first side face portion (61b). The first sealing member (45) is provided on the inner wall surface of the dust storage container (60) that is on the opposite side of the cleaning brush (52) with respect to the rotating brush (51). The first sealing member (45) extends from the inner wall surface of the dust storage container (60) toward the outer peripheral surface of the rotating brush (51).

The first sealing member (45) includes, as shown in FIG. 10, a sealing portion (45*a*) for sealing a space, and an attachment portion (45*b*) for attaching the first sealing member (45) to the first side face portion (61*b*). In cross section, the sealing portion (45*a*) has a flat-plate shape, and the attachment portion (45*b*) has a square U-shape (C-shape). The sealing portion (45*a*) protrudes obliquely upward from the lower end of the outer surface of the attachment portion (45*b*), with an opening of the attachment portion (45*b*) facing upward. The thickness of the sealing portion (45*a*) is reduced as it is closer to the edge.

The lower end of the first side face portion (61*b*) includes a first sealing attachment portion (47) having a flat-plate shape for attachment of the first sealing member (45). The first sealing attachment portion (47) protrudes from the lower end of the first side face portion (61*b*) to directly below the first side face portion (61*b*). The first sealing member (45) is attached to the first side face portion (61*b*) by inserting the first sealing attachment portion (47) into the opening of the attachment portion (45*b*), with the opening of the attachment portion (45*b*) facing upward. The attachment portion (45*b*) is fitted to the first sealing attachment portion (47).

In the first sealing member (45), the edge of the sealing portion (45*a*) is located close to a lower portion of the shaft (51*a*). The first sealing member (45) is designed such that a space between the edge of the sealing portion (45*a*) and the outer peripheral surface of the shaft (51*a*) is, for example, 0.5 mm. The first sealing member (45) may be designed such that the edge of the sealing portion (45*a*) is in contact with the outer peripheral surface of the shaft (51*a*).

Further, according to the present embodiment, the sealing portion (45*a*) extends toward a rotational axis of the shaft (51*a*). That is, if a center line of the sealing portion (45*a*) is extended, the center line intersects the rotational axis of the shaft (51*a*). This means that if a tangent is drawn to intersect the outer peripheral surface of the shaft (51*a*) at a point that is closest to the sealing portion (45*a*) in FIG. 10, the angle formed by the tangent and the surface above the center line of the sealing portion (45*a*), and the angle formed by the tangent and the surface below the center line of the sealing portion (45*a*) are approximately equal to each other.

Further, according to the present embodiment, the lower surface of the first sealing member (45) smoothly continues from the inner surface of the dust storage container (60). Specifically, the inner surface of the dust storage container (60) includes a projecting portion (49) at a boundary between the first side face portion (61*b*) and the storage section (62). The projecting portion (49) protrudes downward from the inner surface of the dust storage container (60). The projecting portion (49) is positioned at a location on the protrusion portion (62*a*) side of the first sealing attachment portion (47), along the first sealing attachment portion (47). The projecting portion (49) extends from the inner surface of the first end face portion (61*d*) to the inner surface of the second end face portion (61*e*). That is, the length of the projecting portion (49) is equal to the length of the first sealing member (45), along the longitudinal direction of the dust storage container (60).

The lower end of the projecting portion (49) is positioned at the same height as the height of the lower end of the first sealing member (45). The lower surface of the projecting portion (49) continues smoothly from the lower surface of the first sealing member (45). Thus, a space between a curved surface (corner surface) of the projecting portion (49) on the first sealing member (45) side, and a curved surface (corner surface) (the lower left corner surface in FIG. 10) of the first sealing member (45) on the projecting portion (49) side is relatively small. Further, the corner portion of the projecting portion (49) on the protrusion portion (62*a*) side has an obtuse angle, so that the lower surface of the projecting portion (49) and the inner surface of the protrusion portion (62*a*) form a smooth, continuous surface. Further, on the lower surface of the first sealing member (45), the bending portion between the sealing portion (45*a*) and the attachment portion (45*b*) has an obtuse angle. Thus, according to the present embodiment, a surface which extends from the inner surface of the protrusion portion (62*a*), through the projecting portion (49), to the edge of the lower surface of the first sealing member (45) is a relatively smooth, continuous surface.

Here, according to the present embodiment, the dust stored in the dust storage container (60) is transferred into dust collecting box (90) by the dust transfer mechanism (80). The dust transfer mechanism (80) utilizes airflow to transfer the dust. When the dust is transferred by the dust transfer mechanism (80), the inner space of the dust storage container (60) serves as an airflow path. Thus, for example, if the first sealing member (45) is provided on an upper portion of the inner wall surface of the first side face portion (61*b*), a corner space sandwiched between the inner wall surface of the first side face portion (61*b*) and the outer peripheral surface of the shaft (51*a*) is formed under the first sealing member (45). As a result, the airflow path at the time of dust transmission by the dust transfer mechanism (80) may have a complex shape due to the corner space. Dust may be retained in the corner space.

In view of this, according to the present embodiment, the first sealing member (45) is provided on the lower end of the first side face portion (61*b*) to prevent the formation of the corner space. As a result, it is possible to prevent dust from being retained in the vicinity of the first sealing member (45) when the dust is transferred by the dust transfer mechanism (80). Further, the lower surface of the first sealing member (45) smoothly continues from the inner surface of the dust storage container (60). Thus, a space between the first sealing member (45) and the projecting portion (49) becomes small, as described above. As a result, it is possible to prevent dust from being stored in a space between the first sealing member (45) and the projecting portion (49).

The second sealing member (46) is a member for sealing a space between the inner wall surface of the second side face portion (61*c*) and the cleaning brush (52). Here, as shown in FIG. 10, a space (57) is formed between the edge portion of the opening (63) and a back surface of the upper end portion of the plate-like member (52*a*) of the cleaning brush (52). In the present embodiment, the second sealing member (46) is provided to prevent dust from flowing out of the dust storage container (60) through the space (57).

The second sealing member (46) includes, like the first sealing member (45), a sealing portion (46*a*) having a flat-plate shape, and an attachment portion (46*b*) having a square U-shape (C-shape) in cross section. The sealing portion (46*a*) protrudes obliquely downward from the lower end of the outer surface of the attachment portion (46*b*), with an opening of the attachment portion (46*b*) facing upward. The thickness of the sealing portion (46*a*) is reduced as it is closer to the edge.

The lower surface of the upper face portion (61*a*) is provided with a flat plate-like second sealing attachment portion (48) for attachment of the second sealing member (46). The second sealing attachment portion (48) protrudes from the lower surface of the upper face portion (61*a*) to directly below the upper face portion (61*a*). The second sealing member (46) is attached to the upper face portion (61*a*) by inserting the second sealing attachment portion (48) into the opening of the attachment portion (46b), with the opening of the attachment portion (46b) facing upward. The attachment portion (46b) is fitted to the second sealing attachment portion (48). In this state, the outer surface of the attachment portion (46b) is in contact with the inner wall surface of the second side face portion (61c), and the edge of the sealing portion (46a) is in contact with the back surface of the cleaning brush (52).

Further, the upper end of the outer surface of the first end face portion (61d) of the removal section (61) is provided with the filter attachment portion (68). The filter attachment portion (68) is a generally U-shaped protrusion in plan view, and has an opening which is open to the side opposite to the storage section (62). As shown in FIG. 6, the width dimension of the inner side of the U-shape of the filter attachment portion (68) is larger than the diameter of the screw portion of the fastening screw (28a) which is screwed into the filter turning shaft (28) of the partition plate (25), and is smaller than the diameter of the filter turning shaft (28).

According to this structure, as shown in FIG. 6, the fastening screw (28a) is screwed into the filter turning shaft (28), with the air filter (30) sandwiched between the filter attachment portion (68) and the radial beam members (27) of the partition plate (25). Therefore, the air filter (30) can be fixed between the filter attachment portion (68) and the partition plate (25). To detach the air filter (30), the fastening screw (28a) is loosened, and the dust storage container (60) having the filter attachment portion (68) is rotated, thereby making it possible to remove only the filter attachment portion (68), with the fastening screw (28a) being screwed into the filter turning shaft (28). As mentioned above, the inner diameter of the shaft insertion portion (33) of the air filter (30) is larger than the diameter of the filter turning shaft (28) of the partition plate (25) and the diameter of the fastening screw (28a), and that is why the air filter (30) can be removed from below.

Further, as shown in FIG. 10, the dust storage container (60) is provided with a storage amount detection mechanism (70) for detecting an amount of dust stored in the storage section (62). The storage amount detection mechanism (70) includes an LED (72) and a phototransistor (73) accommodated in a sensor box (71). The sensor box (71) is provided closer to the second end portion (67) of the storage section (62) of the dust storage container (60), and extends in a transverse direction of the storage section (62) and covers the bottom portion of the storage section (62). The LED (72) and the phototransistor (73) are disposed in the sensor box (71) so as to oppose each other, with the storage section (62) interposed therebetween in the transverse direction of the storage section (62). Further, a first transparent window (64) and a second transparent window (65), which are respectively corresponding to the LED (72) and the phototransistor (73), are formed in the wall of the storage section (62).

In the storage amount detection mechanism (70) according to the above structure, light emitted by the LED (72) passes through the transparent window (64) and then the second transparent window (65), and thereafter, the luminous intensity of the light is detected by the phototransistor (73). The amount of dust stored in the storage section (62) (i.e., the amount of dust filling the storage section (62)) can be checked according to the luminous intensity detected by the phototransistor (73). Specifically, in the case where the amount of dust stored is small, the transmittance of light passing from the first transparent window (64) to the second transparent window (65) in the storage section (62) is high, and therefore, the luminous intensity detected by the phototransistor (73) is high. In contrast, in the case where the amount of dust stored is large, the transmittance of light passing from the first transparent window (64) to the second transparent window (65) in the storage section (62) is low, and therefore, the luminous intensity detected by the phototransistor (73) is low. Therefore, according to the storage amount detection mechanism (70), it is possible to determine that a large amount of dust is stored in the storage section (62) in the case, for example, where the luminous intensity is a certain value or less. Thus, if the storage amount detection mechanism (70) detects that the dust storage amount in the storage section (62) is large even after a dust transfer operation by the dust transfer mechanism (80), described later, for transferring dust in the storage section (62), it is possible to determine that the dust collecting box (90), to which the dust is to be transferred, is full.

The dust transfer mechanism (80) includes the above-mentioned damper box (81) and the transfer duct (88), and an introduction duct (86) and a suction duct (87).

Figure 11:
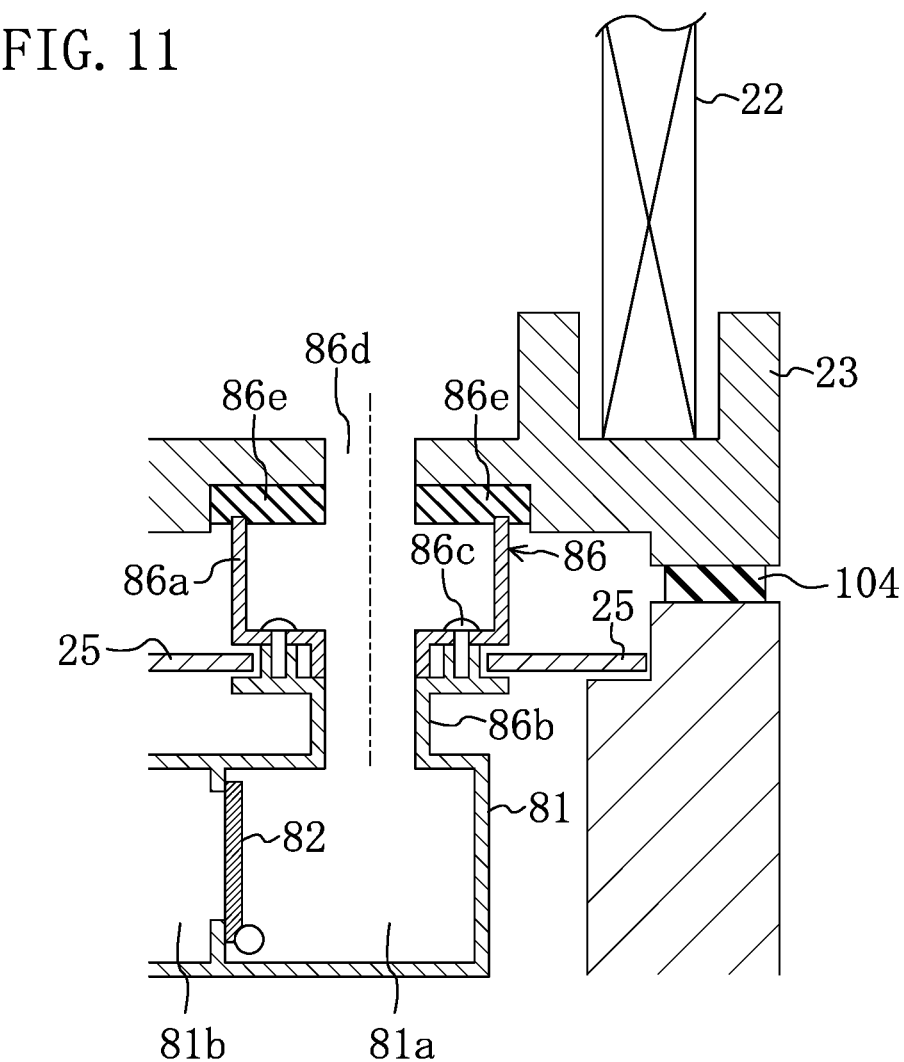
FIG. 11 is an enlarged cross section of an introduction duct.
Figure 12:
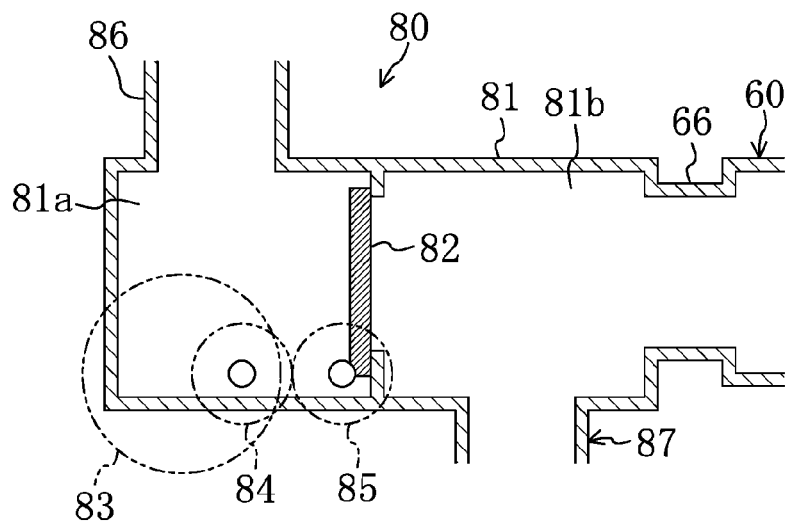
FIG. 12 shows cross sections for illustrating a movement of a damper of the dust transfer mechanism.
Figure 12:
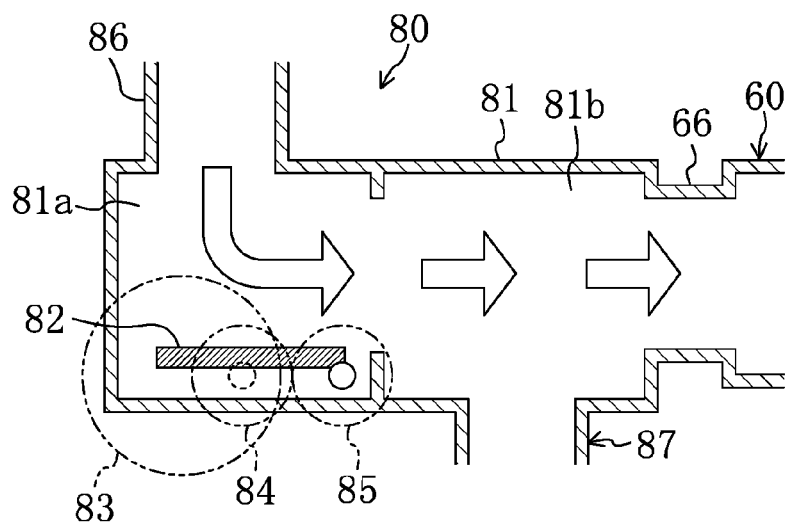
Figure 12:
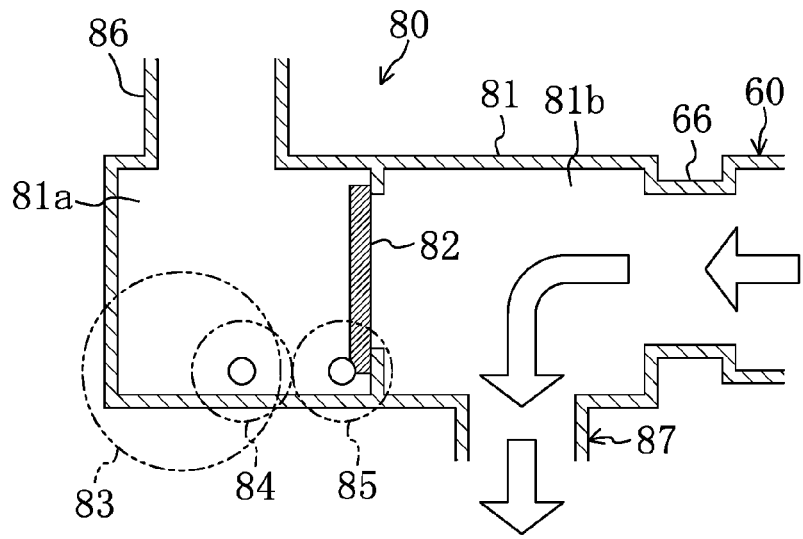

The damper box (81) has a rectangular parallelepiped shape. One end of the damper box (81) along the longitudinal direction thereof is connected to the first end portion (66) of the storage section (62). A damper (82), which is an opening and closing member, is provided in the damper box (81) as shown in FIGS. 11 and 12. When the damper (82) is closed, the interior space of the damper box (81) is partitioned into two chambers along the longitudinal direction of the damper box (81). That is, the interior space of the damper box (81) is partitioned by the damper (82) into a first chamber (81a) on the other side and a second chamber (81b) on the one side to which the dust storage container (60) is connected. As mentioned above, the first end portion (66) of the storage section (62) is connected to the second chamber (81b) formed on the one side of the damper box (81). The second chamber (81b) and the storage section (62) communicate with each other.

As shown in FIGS. 9 and 12, the dust transfer mechanism (80) includes a damper drive motor (83), a drive gear (84), and a driven gear (85), for opening and closing the damper (82). The drive gear (84) is connected to a drive shaft of the damper drive motor (83). The driven gear (85) is connected to a rotating shaft of the damper (82). The drive gear (84) and the driven gear (85) are disposed to engage each other. This structure allows power of the damper drive motor (83) to be transferred to the rotating shaft of the damper (82) by way of the gears (84, 85). As a result, the damper (82) rotates about its rotating shaft according to the rotation of the damper drive motor (83), and thereby performing opening and closing movements.

As shown in FIG. 11, one end of the introduction duct (86) is connected to the upper surface of the damper box (81), and communicates with the first chamber (81a) in the damper box (81). On the other hand, the other end of the introduction duct (86), which extends vertically upward from the damper box (81) and goes through the partition plate (25) between the cleaning unit (100) and the main unit (10), is connected to a protrusion portion of the drain pan (23) of the main unit (10). The introduction duct (86) includes an upstream duct (86a) and a downstream duct (86b) each having a circular cross section. The two members (86a, 86b) are connected to each other in a vertical direction with a fastening screw (86c).

The cross-sectional area (the flow path area) of the upstream duct (86a) is larger than the cross-sectional area (the flow path area) of the downstream duct (86b). The lower end (the lower side in FIG. 11) of the downstream duct (86b) is connected to the upper surface of the damper box (81), whereas the upper end (the upper side in FIG. 11) of the upstream duct (86a) is in contact with the horizontally-extending protrusion portion of the drain pan (23), with a sealing member (86e) interposed therebetween. An introduction opening (86d), which is a through hole, is formed in the protrusion portion of the drain pan (23). The introduction opening (86d) allows the upstream duct (86a) to communicate with the space on the indoor fan (21) side. That is, the introduction duct (86) is configured to introduce the air blown by the indoor fan (21) into the damper box (81).

Further, the connecting portion between the upstream duct (86a) and the downstream duct (86b) of the introduction duct (86) is located at a through hole in the partition plate (25). Specifically, the ducts (86a, 86b) are connected to each other in such a manner that the periphery of the through hole formed in the partition plate (25) is sandwiched between a bottom plate of the upstream duct (86a) and an upper end flange of the downstream duct (86b). This structure allows the upper end of the introduction duct (86) to be connected to the bell mouth (24), with the periphery of the through hole in the partition plate (25) sandwiched between a bottom plate of the upstream duct (86a) and an upper end flange of the downstream duct (86b) to avoid dropping of the introduction duct (86).

Further, because of the structure in which the periphery of the through hole formed in the partition plate (25) is sandwiched between the bottom plate of the upstream duct (86a) and the upper end flange of the downstream duct (86b) as described above, the connecting portion between the upstream duct (86a) and the downstream duct (86b) is rotatable with respect to the partition plate (25). Moreover, according to the present embodiment, the portion at which the upstream duct (86a) and the sealing member (86e) come in contact with each other is rotatable as well. Therefore, the introduction duct (86), the damper box (81), and the dust removal mechanism (50) can rotate integrally with each other about the shaft (introduction opening) of the introduction duct (86).

As shown in FIG. 8 and FIG. 9, one end, i.e., intake side, of the suction duct (87) is connected to a bottom surface of the damper box (81). The suction duct (87) communicates with the second chamber (81b) in the damper box (81). The other end, i.e., discharge side, of the suction duct (87) is connected to a nozzle insertion portion (110) provided on the decorative panel (11). Although not specifically shown, the nozzle insertion portion (110) has an opening for inserting a nozzle of the cleaner for suction.

As shown in FIG. 2 and FIG. 4, one end of the transfer duct (88) is connected to the second end portion (67) of the storage section (62) of the dust storage container (60), and the other end of the transfer duct (88) is connected to a dust collecting box (90). That is, the transfer duct (88) allows the dust storage container (60) and the dust collecting box (90) to communicate with each other. The transfer duct (88) is made of a flexible tube.

In the dust transfer mechanism (80) having the above structure, the damper (82) in the damper box (81) is closed during a normal operation performing heating and cooling operations (see FIG. 12 (A)). Thus, the air blown by the indoor fan (21) is not guided into the second chamber (81b) of the damper box (81). On the other hand, the damper (82) of the damper box (81) is opened in the case where the dust in the dust storage container (60) is transferred to the dust collecting box (90) (see FIG. 12 (B)). Thus, the air blown by the indoor fan (21) is guided into the dust storage container (60) through the introduction duct (86) and the damper box (81). As a result, the dust in the dust storage container (60) flows through the transfer duct (88) together with the guided air, and is transferred into the dust collecting box (90). In other words, the dust in the dust storage container (60) can be transferred to the dust collecting box (90) by opening the damper (82) in the damper box (81) and utilizing the air blown by the indoor fan (21).

Further, in the dust transfer mechanism (80), the damper (82) in the damper box (81) is closed as well, in the case where the dust collected in the dust collecting box (90) is discharged to the outside of the casing (101) (FIG. 12 (C)). In this case, the dust in the dust collecting box (90) is suctioned by a cleaner from the nozzle insertion portion (110) through the transfer duct (88), the damper box (81), and the suction duct (87).

The dust collecting box (90) is for storing dust transferred from the dust storage container (60). The dust collecting box (90) has a slightly elongated, generally rectangular parallelepiped shape, and is located under the partition plate (25) like the dust storage container (60) as shown in FIG. 4. Further, the dust collecting box (90) is positioned on a lateral side of the air filter (30) along one edge of the partition plate (25) such that the dust collecting box (90) does not overlap with the air filter (30) in plan view. Moreover, in order to reliably prevent interference with the air filter (30), the dust collecting box (90) is configured such that a side plate on the air filter (30) side has an arc shape so as to correspond to the outer periphery of the air filter (30).

Further, a side surface of one end portion (one side portion) of the dust collecting box (90) is provided with a receiving opening (94). The other end of the transfer duct (88) is connected to the receiving opening (94). On the other hand, the other end portion (the other side portion) of the dust collecting box (90) is provided with a discharge opening (91) that is open to the interior of the chamber casing (101) of the cleaning unit (100). In other words, the dust collecting box (90) is provided with the discharge opening (91) at its one end that is opposite to the side to which the transfer duct (88) is connected, and therefore, air can flow smoothly in the interior of the dust collecting box (90) in its longitudinal direction. Further, the cross-sectional area of part of the dust collecting box (90) that is on the discharge opening (91) side is smaller than the cross-sectional area of the other part of the dust collecting box (90).

Further, a filter (92) is provided in the dust collecting box (90) at a location close to the discharge opening (91). When dust is transferred into the dust collecting box (90) from the dust storage container (60), the filter (92) captures the transferred dust and does not allow the dust to flow out through the discharge opening (91), while allowing the air to be discharged through the discharge opening (91). Further, when dust is taken from the dust collecting box (90) by suction of a cleaner, room air flows into the dust collecting box (90) through the discharge opening (91). However, dust in the air which flows into the dust collecting box (90) is captured by the filter (92). As described, the pressure in the dust collecting box (90) is properly balanced by the intake and discharge of air through the discharge opening (91). Thus, the dust transfer operation to the dust collecting box (90) and the dust discharge operation from the dust collecting box (90) are properly done.

—Operational Behavior—

Now, operational behavior of the indoor unit (3) will be described. The indoor unit (3) is capable of switching between the normal operation in which cooling and heating operations are performed, and the filter cleaning operation for cleaning the air filter (30).

<Normal Operation>

During the normal operation, the damper (82) of the damper box (81) is in the closed state (the state as shown in FIG. 12 (A)). The air filter (30) is not rotating, but is halted.

The indoor fan (21) is actuated in this state. Then, in the indoor unit (3), room air taken through the inlet (13) passes through the air filter (30) and flows into the bell mouth (24).

When the air passes through the air filter (30), dust in the air is captured by the mesh member (37) of the air filter (30). The air having flowed into the bell mouth (24) is blown out by the indoor fan (21). The blown air is cooled or heated by heat exchange with the refrigerant of the indoor heat exchanger (22), and is then supplied into the room through each outlet (14). The room air is cooled or heated in this way. During this operation, the damper (82) of the damper box (81) is closed as shown in FIG. 12(A), and therefore, the air blown by the indoor fan (21) is not introduced to the dust storage container (60) through the damper box (81).

<Filter Cleaning Operation>

During the filter cleaning operation, operation of the compressor (4) is stopped, and the refrigerant does not circulate in the refrigerant circuit shown in FIG. 1. The filter cleaning operation is capable of switching between a dust removal operation, a brush cleaning operation, a dust transfer operation, and a dust discharge operation. The LED (16) provided on the decorative panel (11) is on during the dust removal operation, the brush cleaning operation, and the dust transfer operation. This structure enables users to be informed that these operations are being performed.

The dust removal operation is an operation for removing dust captured by the air filter (30). The brush cleaning operation is an operation for removing dust captured by the rotating brush (51). The dust transfer operation is an operation for transferring dust from the dust storage container (60) to the dust collecting box (90). The dust discharge operation is an operation for discharging dust from the dust collecting box (90) to the outside of the indoor unit (3). In the present embodiment, the dust removal operation and the brush cleaning operation are performed alternately.

—Dust Removal Operation—

In the dust removal operation, the indoor fan (21) is operated such that the indoor fan (21) blows a breeze. The flocked portion (51b) of the rotating brush (51) is brought into contact with the air filter (30). In this state, the air filter (30) is turned such that the piles of the flocked portion (51b) of the rotating brush (51) are stroked the wrong way by the air filter (30) (in the direction indicated by white arrow in FIG. 13(B) and FIG. 14(A)). Here, rotation of the rotating brush (51) is stopped.

Figure 14:
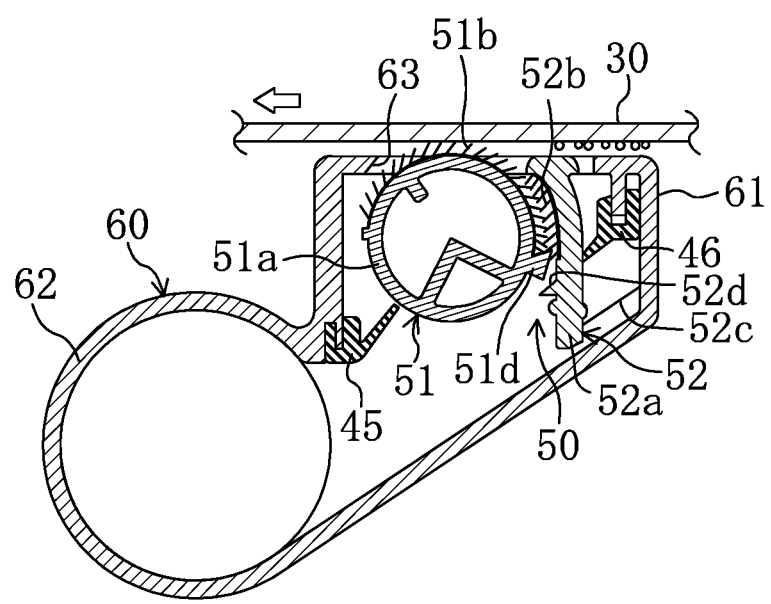
FIG. 14 shows a movement of a dust removal mechanism during a dust removal operation, at a cross section taken along the line XIV-XIV in FIG. 8.
Figure 14:
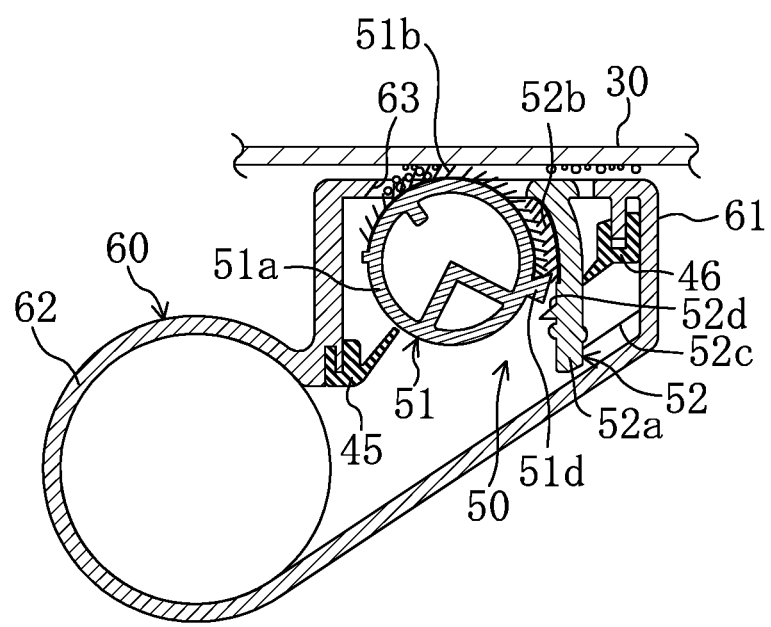

In this way, the dust on the air filter (30) is captured by the flocked portion (51b) of the rotating brush (51) (FIG. 14 (B)). Here, as shown in FIG. 14(A), the piles of the flocked portion (51b) are inclined in a direction opposite to the turning direction of the air filter (30), and therefore, the dust on the air filter (30) can be easily scraped off by the flocked portion (51b). When the lever (44a) of the limit switch (44) of the filter drive device (40) moves, the filter drive motor (41) is stopped, and the rotation of the air filter (30) is stopped. In other words, the air filter (30) rotates at a predetermined angle and stops. Thus, the dust is removed from an area of the air filter (30) with which the flocked portion (51b) of the rotating brush (51) is brought into contact.

—Brush Cleaning Operation—

The dust removal operation is switched to the brush cleaning operation when the rotation of the air filter (30) stops.

At the time when the rotation of the air filter (30) is stopped, the dust is gathered on the left side (i.e., the leading side of the rotational direction of the air filter (30)) of the flocked portion (51b) of the rotating brush (51). This is because the dust scraped off by the flocked portion (51b) is dragged along the moving air filter (30). Thus, the dust may increase in size with time, and may eventually fall into the room etc.

Figure 13:
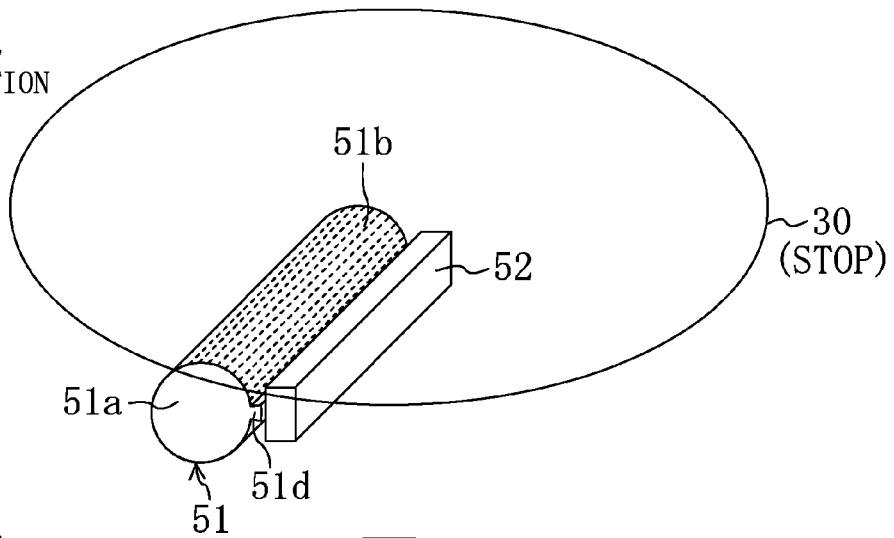
FIG. 13 schematically illustrates a relationship between an air filter and a dust removal mechanism.
Figure 13:
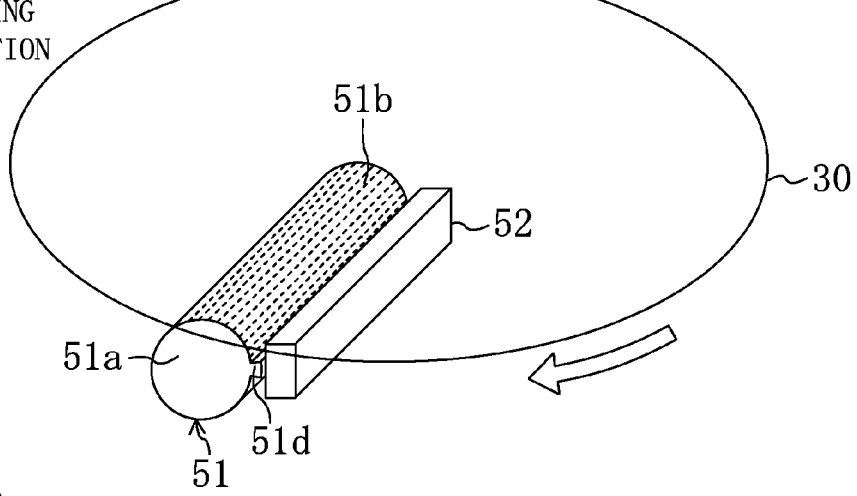
Figure 13:
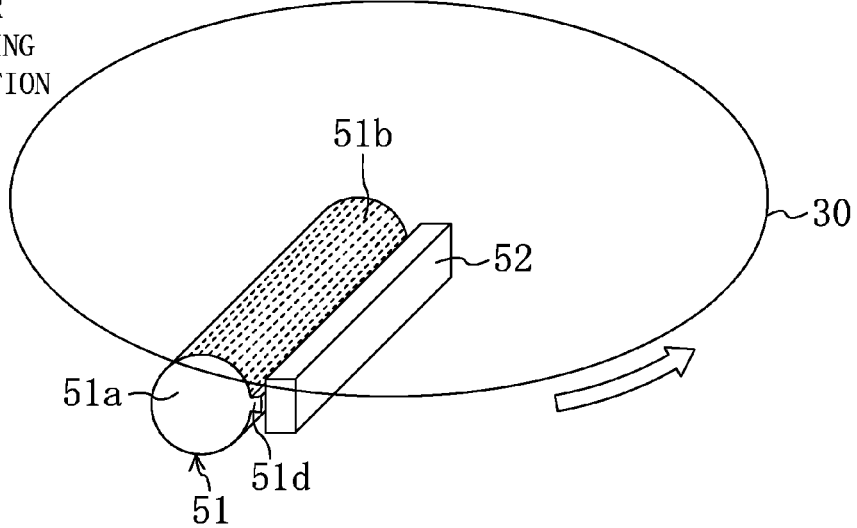

Thus, in the brush cleaning operation, the air filter (30) is first turned by the filter drive device (40) until the air filter (30) is returned by a desired angle in a counterclockwise direction, as shown in FIG. 13(C). In other words, as shown in FIG. 15(A), the air filter (30) is turned in a direction opposite to the direction along which the air filter (30) is turned during the dust removal operation, that is, in a direction generally equal to the direction along which piles of the flocked portion (51b) of the rotating brush (51) extend. In the present embodiment, the air filter (30) is turned until the air filter (30) is moved at an angle corresponding to the width of the flocked portion (51b) of the rotating brush (51).

As a result of the turning, the dust gathered on one side of the flocked portion (51b) of the rotating brush (51) is spread through a wide area of the flocked portion (51b) by the air filter (30) and is flattened, as shown in FIG. 15(A). In other words, the dust adheres to a wide area of the flocked portion (51b) more evenly. As a result, the dust adheres to the flocked portion (51b) more firmly. Thus, it is possible to more reliably prevent accumulation of the dust from falling into the room etc.

Figure 15:
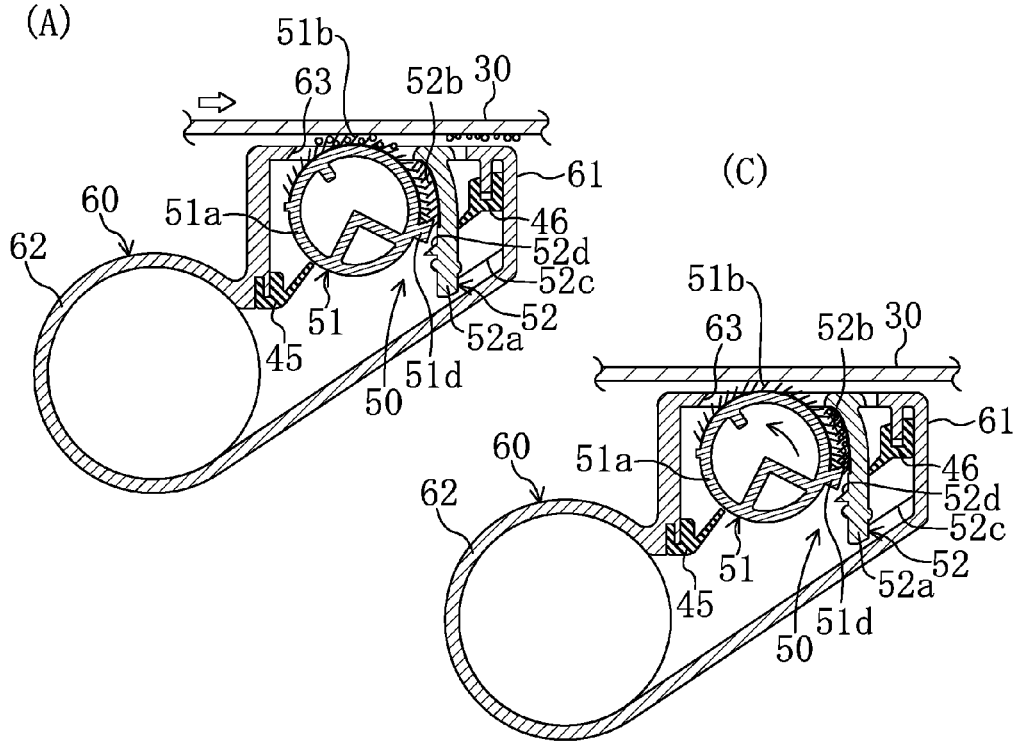
FIG. 15 shows a movement of a dust removal mechanism during a brush cleaning operation.

Next, in the brush cleaning operation, the rotating brush (51) is rotated rightward (in a clockwise direction) in FIG. 15, with the air filter (30) being stopped. Here, the rotating brush (51) is rotated such that the flocked portion (51b) to which dust is still adheres comes in contact with the flocked portion (52b) of the cleaning brush (52) (FIG. 15(B)). The rotating brush (51) is rotated at a predetermined angle, and then stopped.

After that, the rotating brush (51) rotates in a direction opposite to the above rotational direction (in a leftward (counterclockwise) direction in FIG. 15). As a result, the dust captured by the flocked portion (51b) of the rotating brush (51) is captured by the flocked portion (52b) of the cleaning brush (52) (FIG. 15 (C)). This is because the piles of the flocked portion (52b) of the cleaning brush (52) are inclined downward, i.e., inclined such that the piles are stroked the wrong way by the rotating brush (51) rotating counterclockwise, and thus because the dust adhering to the flocked portion (51b) of the rotating brush (51) is scraped off by the cleaning brush (52).

Further, the plate-like member (52a) of the cleaning brush (52) is pushed in a direction away from the rotating brush (51) because of the flocked portions (51b, 52b) of the rotating brush (51) and the cleaning brush (52) coming in contact with each other. However, the plate-like member (52a) is biased to the rotating brush (51) by the spring (52c). Therefore, the flocked portions (51b, 52b) are not spaced from each other, and the cleaning brush (52) is adequately pushed against the rotating brush (51). As a result, the dust can be reliably removed from the flocked portion (51b) of the rotating brush (51), and captured in the flocked portion (52b) of the cleaning brush (52). The rotating brush (51) is rotated until it returns to the original position (the position shown in FIG. 15 (A)) and then stops.

After that, the rotating brush (51) is again rotated rightward (clockwise) at a predetermined rotation angle. As a result, the dust captured by the flocked portion (52b) of the cleaning brush (52) is scraped off by the flocked portion (51b) of the rotating brush (51) (FIG. 15 (D)). That is, the dust can be scraped off from the flocked portion (52b) of the cleaning brush (52) because the piles of the flocked portion (51b) of the rotating brush (51) are inclined downward along a rotational direction. Here, the cleaning brush (52) is adequately pushed against the rotating brush (51) by the spring (52c), and therefore, the dust can be removed from the cleaning brush (52) more reliably.

In this way, the dust captured by the rotating brush (51) is removed and stored in the storage section (62) of the dust storage container (60). After that, the rotating brush (51) is again rotated leftward (counterclockwise) to return to the original position (FIG. 11 (A)). The brush cleaning operation temporarily ends here.

In the brush cleaning operation, the rotating brush (51) is rotated such that the flocked portion (51b) moves back and forth only in a brush passage region that is part of a region along the entire circumference of the outer peripheral surface of the rod-like member (51a). In other words, the flocked portion (51b) passes through only the brush passage region that is part of a region around the rotational axis of the rotating brush (51). The region along the entire circumference of the outer peripheral surface of the rod-like member (51a) includes the brush passage region and an exposed region through which the flocked portion (51b) does not pass, but through which only the part where the outer peripheral surface of the rod-like member (51a) is exposed passes. The first sealing member (45) is in the vicinity of, or in contact with, the outer peripheral surface of the rod-like member (51a) in the exposed region. Thus, the first sealing member (45) is prevented from coming in contact with the flocked portion (51b).

After the above-described brush cleaning operation ends, the above-described dust removal operation is performed again. That is, the air filter (30) is turned again, and is stopped when the lever (44a) of the limit switch (44) is actuated again. As a result, the dust is removed from an area of the air filter (30) that is stroked by the flocked portion (51b) of the rotating brush (51), and is captured by the flocked portion (51b) of the rotating brush (51). The dust removal operation and the brush cleaning operation are alternately repeated as described above, removing the dust on the air filter (30) from an area to an area. When the dust is removed from the entire area of the air filter (30), the dust removal operation and the brush cleaning operation are completed. For example, when the lever (44a) of the limit switch (44) is actuated a predetermined number of times, the air filter (30) is considered as having made one turn, and the above operations are finished.

—Dust Transfer Operation—

In the dust removal operation and the brush cleaning operation, the amount of dust stored in the dust storage container (60) is detected by the storage amount detection mechanism (70). Specifically, luminous intensity of light emitted by the LED (72) is detected by the phototransistor (73). If the luminous intensity detected by the phototransistor (73) is equal to or less than a set value (a lower limit), it is considered that the amount of dust stored in the storage container (60) has reached a predetermined amount, and the operation is switched to the dust transfer operation.

In the dust transfer operation, the rotating brush (51) is stopped at the position as shown in FIG. 10, and the air filter (30) is stopped as well. Further, the damper (82) of the damper box (81) is in the open state (the state as shown in FIG. 12 (B)). The indoor fan (21) is actuated in this state, and therefore, the air blown by the indoor fan (21) is introduced into the dust storage container (60) through the introduction duct (86) and the damper box (81). Thus, the dust in the dust storage container (60) is transferred into the dust collecting box (90) through the transfer duct (88) together with the air. As a result, the amount of dust stored in the dust storage container (60) decreases, and the luminous intensity detected by the phototransistor (73) increases. When the detected luminous intensity is a set value (an upper limit) or above, it is considered that almost all of the dust in the dust storage container (60) is discharged, and the dust transfer operation is finished. After that, the dust removal operation or the brush cleaning operation starts again.

—Dust Discharge Operation—

The filter cleaning operation according to the present embodiment is performed under certain conditions. Specifically, the LED (72) is turned on after the damper (82) is opened in the dust transfer operation, and luminous intensity of light emitted by the LED (72) is detected. If the luminous intensity is equal to or less than a predetermined value, it is considered that the dust in the dust storage container (60) is not transferred by the air blown by the indoor fan (21), i.e., that the transfer path from the dust storage container (60) to the dust collecting box (90) is clogged with dust, or that the dust collecting box (90) is filled with a large amount of dust. The LED (16) on the decorative panel (11) is turned on to inform the user about the situation, and the dust discharge operation as described below is performed according to the instruction from a remote controller etc.

In the dust discharge operation, the rotating brush (51) is stopped at the position as shown in FIG. 10, and the air filter (30) is stopped as well, as in the above-described dust transfer operation. Further, the damper (82) of the damper box (81) is in the closed state (the state as shown in FIG. 12 (C)).

In this state, the nozzle of the cleaner is inserted, by the user, in the nozzle insertion portion (110) on the decorative panel (11) for suction. As a result of the suction, the dust in the dust collecting box (90) is suctioned by the cleaner through the transfer duct (88), the dust storage container (60), the damper box (81), the suction duct (87), and the nozzle insertion portion (110). The dust remaining in the dust storage container (60) is simultaneously suctioned by the cleaner through the suction duct (87). As a result, the dust in the dust collecting box (90) and the dust storage container (60) is discharged out of the indoor unit (3).

—Effects of Embodiments—

According to the present embodiment, a space between the inner wall surface of the dust storage container (60) and the brush mechanism (51,52) is sealed with the sealing member (45) which is provided in the dust storage container (60) and between the space in which dust is stored and the opening (63). Thus, almost no airflow flowing from the space in which dust is stored to the opening (63) is generated in the dust storage container (60) during the operation of the indoor fan (21). Accordingly, it is possible to prevent the dust in the dust storage container (60) from passing through the space between the inner wall surface of the dust storage container (60) and the brush mechanism (51, 52) and flowing out through the opening (63).

Further, according to the present embodiment, the first sealing member (45) is attached not to the rotating brush (51), but to the inner wall surface of the dust storage container (60). Thus, the location of the first sealing member (45) is not changed by the rotation of the rotating brush (51). It is therefore possible to seal the space between the inner wall surface of the dust storage container (60) and the outer peripheral surface of the rotating brush (51) with the first sealing member (45) all the time. As a result, it is possible to prevent the generation of an airflow flowing from the interior space of the dust storage container (60), in which dust is stored, to the opening (63) more reliably, and possible to prevent the dust in the above space from flowing out through the opening (63) more reliably.

Further, according to the present embodiment, of the spaces located on both lateral sides of the outer peripheral surface of the rotating brush (51), the space on the side of the first side face portion (61b) is sealed with the first sealing member (45), and the space on the side of the second side face portion (61c) is sealed with the cleaning brush (52), thereby enabling sealing of the both spaces. Furthermore, the structure in the dust storage container (60) can be simplified by configuring the cleaning brush (52) to serve as a sealing member as well, in one of the spaces located on both lateral sides of the outer peripheral surface of the rotating brush (51).

Further, according to the present embodiment, the first sealing member (45) is positioned at a location opposite to the side at which the dust adhering to the rotating brush (51) is dropped by the cleaning brush (52), with respect to the rotating brush (51). In other words, the first sealing member (45) is located on one of the spaces located on both lateral sides of the outer peripheral surface of the rotating brush (51) that is on the side at which almost no dust is dropped. Thus, almost no dust is accumulated on the upper surface of the first sealing member (45). It is therefore possible to prevent dust in the dust storage container (60) from flowing out through the opening (63).

Further, according to the present embodiment, the sealing portion (45a) of the first sealing member (45) extends upward from the outer surface of the attachment portion (45b). Thus, even if dust drops on the upper surface of the first sealing member (45), the dust will be accumulated on part of the sealing portion (45a) that is close to the attachment portion (45b). Therefore, it is possible to prevent a malfunction of the rotating brush (51) due to dust.

Further, according to the present embodiment, the first sealing member (45) is in the vicinity of, or in contact with, the outer peripheral surface of the rod-like member (51a) in the region through which the flocked portion (51b) does not pass. Therefore, the first sealing member (45) is prevented from coming in contact with the flocked portion (51b). Thus, according to the present embodiment, it is possible to prevent the flocked portion (51b) from being damaged by contact with the first sealing member (45).

Further, according to the present embodiment, even in the case where the sealing portion (45a) of the first sealing member (45) is in contact with the outer peripheral surface of the rotating brush (51), the rotational torque of the rotating brush (51) is generally the same whether the rotating brush (51) is rotated in either direction about the rotational axis, because the sealing portion (45a) extends toward the rotational axis of the rotating brush (51). Thus, according to the present embodiment, it is possible to prevent a malfunction of the rotating brush (51) when the rotating brush (51) is rotated in one direction about the rotational axis.

Further, according to the present embodiment, the first sealing member (45) is provided on an inner wall surface of the upper portion (61) in which the brush mechanism (51, 52) is accommodated, the inner wall surface being on the side of the lower portion (62) in which much dust is stored. Thus, the dust in the dust storage container (60) can be effectively prevented from flowing out through the opening (63) by the first sealing member (45).

<<Other Embodiments>>

The following structures may be used in the above embodiment.

In the above embodiment, the first sealing member (45) may be positioned at about a midpoint location of the height of the first side face portion (61b), or may be positioned at an upper end portion of the first side face portion (61b).

Further, in the above embodiment, the first sealing member (45) may be positioned at a location other than the first side face portion (61b) (e.g., at a lower surface of the upper face portion (61a)).

Further, in the above embodiment, the first sealing member (45) may be configured such that the first sealing member (45) is attached to the rotating brush (51), and extends toward an inner surface of the dust storage container (60) from the rotating brush (51) so as to be in the vicinity of, or in contact with, the inner surface.

In the above embodiment, the dust collecting box (90) may not be provided, and only the dust storage container (60) is provided as a container for storing dust.

In the above embodiment, the dust storage container (60) may be such that the lower portion (62) has a cross section that does not protrude from the lower end of the upper portion (61) toward a lateral side (e.g., a rectangular shape).

INDUSTRIAL APPLICABILITY

As described above, the present invention is useful as indoor units of air conditioners which have a function of removing dust adhering to an air filter.

DESCRIPTION OF REFERENCE CHARACTERS 30 air filter
45 first sealing member
46 second sealing member
51 rotating brush (brush mechanism)
51a shaft (rod-like member)
51b flocked portion
52 cleaning brush (brush cleaning member, brush mechanism)
58 storage space
60 dust storage container
61 removal section (upper portion)
62 storage section (lower portion)
63 opening

The invention claimed is:

1. An indoor unit of an air conditioner, comprising:
an indoor fan;
an air filter for capturing dust in an air drawn by the indoor fan;
a brush mechanism for removing the dust adhering to the air filter; and
a dust storage container having an opening in which the brush mechanism is positioned, for storing the dust removed from the air filter by the brush mechanism, wherein
the indoor unit includes a sealing member provided in the dust storage container and between the opening and a storage space in which the dust is stored, for sealing a space between an inner wall surface of the dust storage container and the brush mechanism,
the brush mechanism includes a rotating brush having a flocked portion which is provided on an outer peripheral surface of a rotatable, rod-like member and which comes in contact with the air filter, and
the sealing member is provided at least between the inner wall surface of the dust storage container and the rotating brush, and is attached to the dust storage container.

2. The indoor unit of the air conditioner of claim 1, wherein the brush mechanism includes
the rotating brush, and
a brush cleaning member which is provided in a space between the outer peripheral surface of the rotating brush and an inner wall surface of the dust storage container that is opposite to the sealing member with respect to the rotating brush, and which is provided along an axial direction of the rotating brush, for coming in contact with the flocked portion and removing the dust adhering to the flocked portion.

3. The indoor unit of the air conditioner of claim 2, wherein
the sealing member extends from the inner wall surface of the dust storage container to a lower portion of the rotating brush.

4. The indoor unit of the air conditioner of claim 2 or claim 3, wherein
the rotating brush is configured such that the flocked portion is provided only in a region of the outer peripheral surface of the rod-like member in a circumferential direction, and is configured so as to be rotatable in opposite directions about a rotational axis in such a manner that the flocked portion moves back and forth in a predetermined angle region of a region along an entire circumference of the rod-like member, and
the sealing member extends toward a region other than the predetermined angle region of the region along the entire circumference of the rod-like member.

5. The indoor unit of the air conditioner of claim 4, wherein
the sealing member includes a flat plate-shaped sealing portion which extends from the inner wall surface of the dust storage container to the rotational axis of the rotating brush.

6. The indoor unit of the air conditioner of any one of claims 1-3, wherein
the dust storage container includes an upper portion which accommodates the brush mechanism, and a lower portion which protrudes from a lower end of the upper portion to a lateral side, thereby forming the storage space, and
the sealing member is provided on an inner wall surface of the upper portion that is on the side from which the lower portion protrudes.

* * * * *